United States Patent
van Dam et al.

(10) Patent No.: US 12,078,625 B2
(45) Date of Patent: Sep. 3, 2024

(54) SYSTEM AND METHOD FOR HIGH-THROUGHPUT RADIO THIN LAYER CHROMATOGRAPHY ANALYSIS

(71) Applicant: THE REGENTS OF THE UNIVERSITY OF CALIFORNIA, Oakland, CA (US)

(72) Inventors: R. Michael van Dam, Sherman Oaks, CA (US); Jia Wang, Los Angeles, CA (US); Alejandra Rios, Los Angeles, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 413 days.

(21) Appl. No.: 17/605,213

(22) PCT Filed: Apr. 15, 2020

(86) PCT No.: PCT/US2020/028362
§ 371 (c)(1),
(2) Date: Oct. 20, 2021

(87) PCT Pub. No.: WO2020/219318
PCT Pub. Date: Oct. 29, 2020

(65) Prior Publication Data
US 2022/0244228 A1  Aug. 4, 2022

Related U.S. Application Data

(60) Provisional application No. 62/838,874, filed on Apr. 25, 2019.

(51) Int. Cl.
*G01N 30/95* (2006.01)
*G01N 35/10* (2006.01)
*H04N 25/71* (2023.01)

(52) U.S. Cl.
CPC .......... *G01N 30/95* (2013.01); *G01N 35/10* (2013.01); *H04N 25/71* (2023.01)

(58) Field of Classification Search
CPC ........ G01N 30/95; G01N 35/10; G01N 30/88; G01N 30/90; H04N 25/71
See application file for complete search history.

(56) References Cited

U.S. PATENT DOCUMENTS

| 9,005,544 B2 | 4/2015 | van Dam et al. |
| 9,649,632 B2 | 5/2017 | van Dam et al. |

(Continued)

FOREIGN PATENT DOCUMENTS

| EP | 3523047 B1 | 3/2021 |
| WO | 2018/048856 A1 | 3/2018 |

(Continued)

OTHER PUBLICATIONS

"Visualization and Quantification of Radiochemical Purity by Cerenkov Luminescence Imaging" by Ha et al. (Year: 2018).*

(Continued)

*Primary Examiner* — Xin Y Zhong
(74) *Attorney, Agent, or Firm* — VISTA IP LAW GROUP LLP

(57) ABSTRACT

A method of performing high-throughput radio thin layer chromatography (radio-TLC) includes spotting a plurality of locations on one or more TLC plates with samples containing a radiochemical or a radiopharmaceutical, each location defining an individual lane on the one or more TLC plates for the respective samples. The one or more TLC plates are developed with a developing solution and dried. The TLC plates are imaged with an imaging device comprising a camera, wherein the image obtained from the camera comprises a field of view that contains regions of interest (ROIs) from the plurality of lanes. The ROIs in the images obtained (Continued)

from the camera may then be analyzed by the user. The ROIs may be used, for example, reaction optimization or for quality control check of the production of radiotracers.

24 Claims, 19 Drawing Sheets

(56) References Cited

U.S. PATENT DOCUMENTS

| | | | |
|---|---|---|---|
| 10,081,005 | B2 | 9/2018 | Moore et al. |
| 10,473,668 | B2 | 11/2019 | van Dam et al. |
| 10,589,250 | B2 | 3/2020 | Schopf et al. |
| 2010/0291584 | A1 | 11/2010 | Tseng et al. |
| 2012/0107175 | A1 | 5/2012 | Satyamurthy et al. |
| 2015/0230696 | A1* | 8/2015 | Tuch .................... A61B 5/0071 600/431 |
| 2019/0072493 | A1* | 3/2019 | Wang .................... B01J 20/283 |
| 2020/0147548 | A1 | 5/2020 | van Dam et al. |

FOREIGN PATENT DOCUMENTS

| | | | |
|---|---|---|---|
| WO | 2018/067965 | A1 | 4/2018 |
| WO | 2020219318 | A1 | 10/2020 |
| WO | 2020/237195 | A1 | 11/2020 |
| WO | 2021/026441 | A1 | 2/2021 |

OTHER PUBLICATIONS

PCT International Preliminary Report on Patentability (Chapter I of the Patent Cooperation Treaty) for PCT/US2020/028362 Applicant: The Regents of the University of California, Form PCT/IB/326 and 373, dated Nov. 4, 2021 (8 pages).
Jennifer S Cho et al., Cerenkov radiation imaging as a method for quantitative measurements of beta particles in a microfluidic chip, Phys. Med. Biol. 54 (2009) 6757-6771.
Alex A. Dooraghia et al., Optimization of microfluidic PET tracer synthesis with Cerenkov imaging†, Analyst. Oct. 7, 2013; 138(19): 5654-5664. doi:10.1039/c3an01113e.
Wolfgang P. Fendler et al., Establishing 177Lu-PSMA-617 Radioligand Therapy in a Syngeneic Model of Murine Prostate Cancer, J Nucl Med 2017; 58:1786-1792, DOI: 10.2967/jnumed.117.193359.
Yeong Su Ha et al., Visualization and Quantification of Radiochemical Purity by Cerenkov Luminescence Imaging, Anal. Chem. 2018, 90, 8927-8935.
Noel S. Ha et al., Recent Progress toward Microfluidic Quality Control Testing of Radiopharmaceuticals, Micromachines 2017, 8, 337; doi:10.3390/mi8110337.
Jason P. Holland et al., Intraoperative Imaging of Positron Emission Tomographic Radiotracers Using Cerenkov Luminescence Emissions, Mol Imaging. Jun. 2011 ; 10(3): 177-186.
S.J. Jeon et al., Pixelated scintillator-based compact radio thin layer chromatography scanner for radiopharmaceuticals quality control, S.J. Jeon et al 2017 JINST 12 T11003.
Pei Yuin Kenga et al., Micro-chemical synthesis of molecular probes on an electronic microfluidic device, PNAS, vol. 109, No. 3, Jan. 17, 2012, 690-695.
D. Maneuskia et al., On the use of positron counting for radio-Assay in nuclear pharmaceutical production, Applied Radiation and Isotopes 125 (2017) 9-14.
Gregory S. Mitchell et al., In vivo Cerenkov luminescence imaging: a new tool for molecular imaging, Phil. Trans. R. Soc. A (2011) 369, 4605-4619, doi:10.1098/rsta.2011.0271.
Norhafizah Othman et al., Imaging Scanner Usage in Radiochemical Purity Test, Penggunaan Imaging Scanner DalamUjian Ketulinan Riadiokimia, (2011) (10 pages).
Jeong Chan Park et al., Luminescence imaging using radionuclides: a potential application in molecular imaging, Nuclear Medicine and Biology 38 (2011) 321-329.
Alessandro Ruggiero et al., Cerenkov luminescence imaging of medical isotopes, J Nucl Med. Jul. 2010 ; 51(7): 1123-1130. doi:10.2967/jnumed.110.076521.
Antonello E. Spinelli et al., Unified approach for bioluminescence, Cerenkov, β, X and γ rays imaging, Biomedical Optics Express, Jun. 1, 2015, vol. 6, No. 6, 2168-2180, DOI:10.1364/BOE.6.002168.
W.Y. Tseng et al., Toward Reliable Synthesis of Radiotracers for Positron Emission Tomograpy in PDMS Microfluidic Chips: Study and Optimization of the [18F]Fluoride Drying Process, NSTI-Nanotech 2010, www.nsti.org, ISBN 978-I-4398-3402-2 vol. 2, 2010, 472-475.
PCT International Search Report for PCT/US2020/028362, Applicant: The Regents of the University of California, Form PCT/ISA/210 and 220, dated Jul. 20, 2020 (4pages).
PCT Written Opinion of the International Search Authority for PCT/US2020/028362, Applicant: The Regents of the University of California, Form PCT/ISA/237, dated Jul. 20, 2020 (6pages).
Antonello E. Spinelli et al., Cerenkov radiation allows in vivo optical imaging of positron emitting radiotracers, Phys. Med. Biol. 55 (2010) 483-495.

* cited by examiner

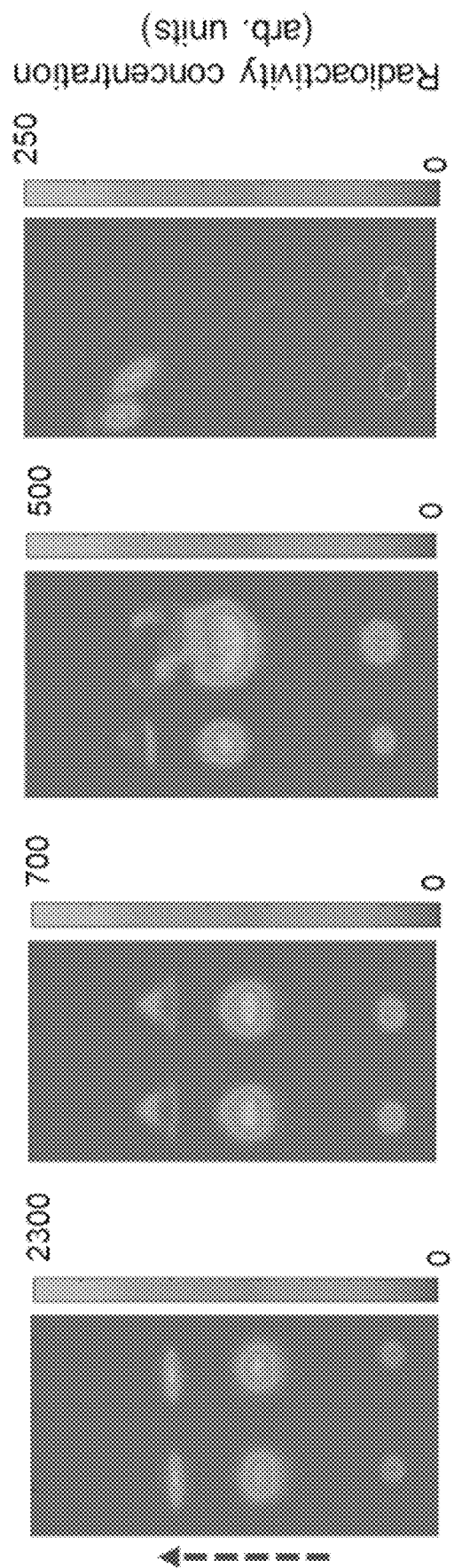

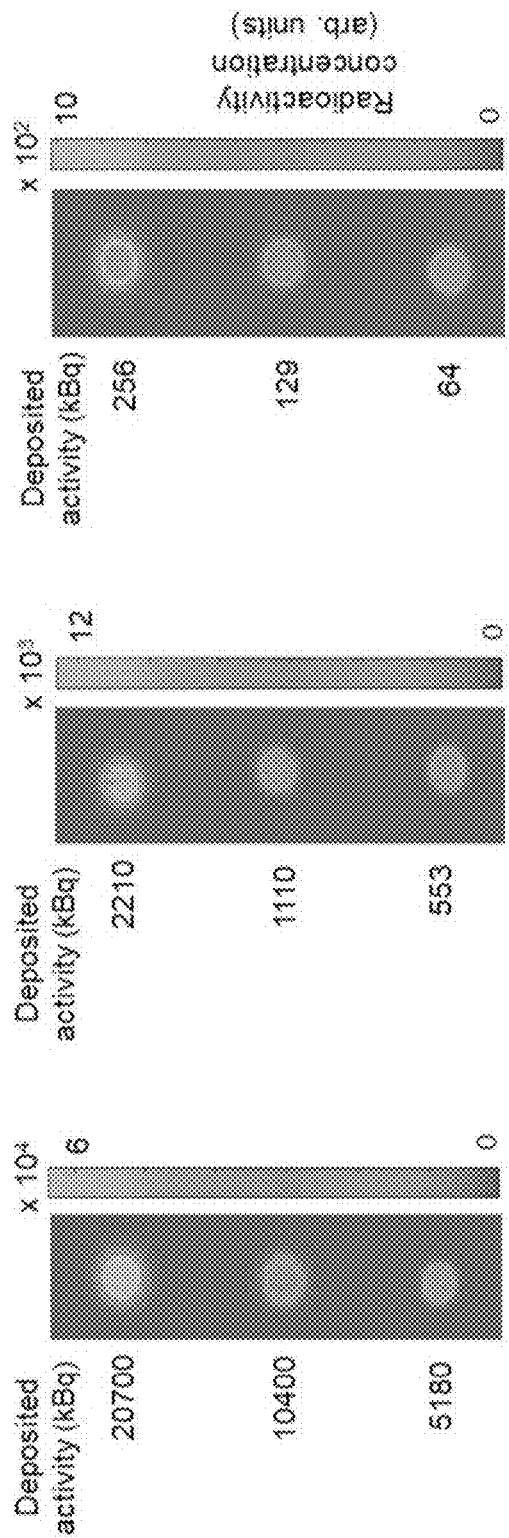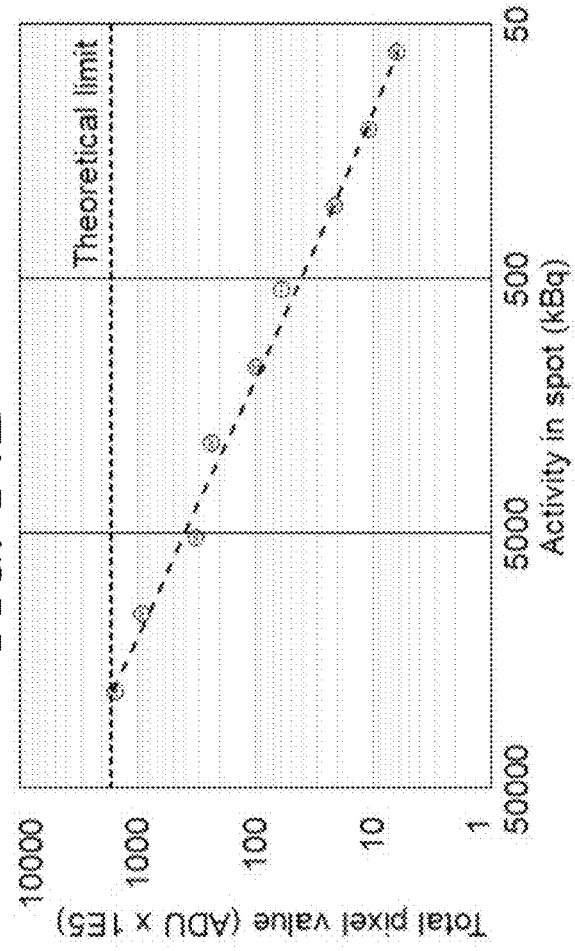
FIG. 14A  FIG. 14B  FIG. 14C  FIG. 14D

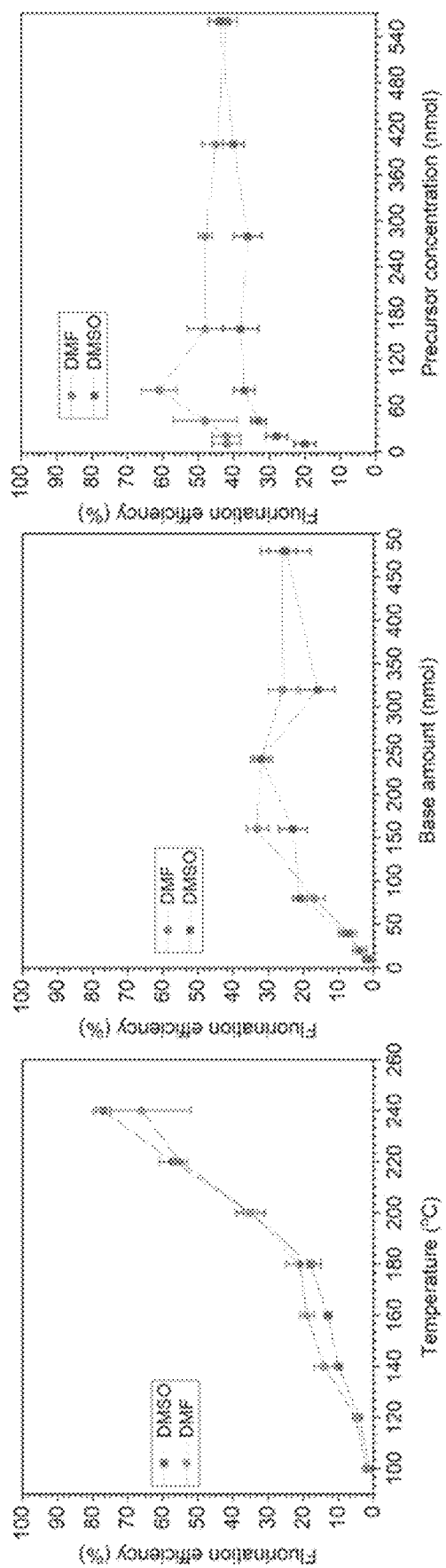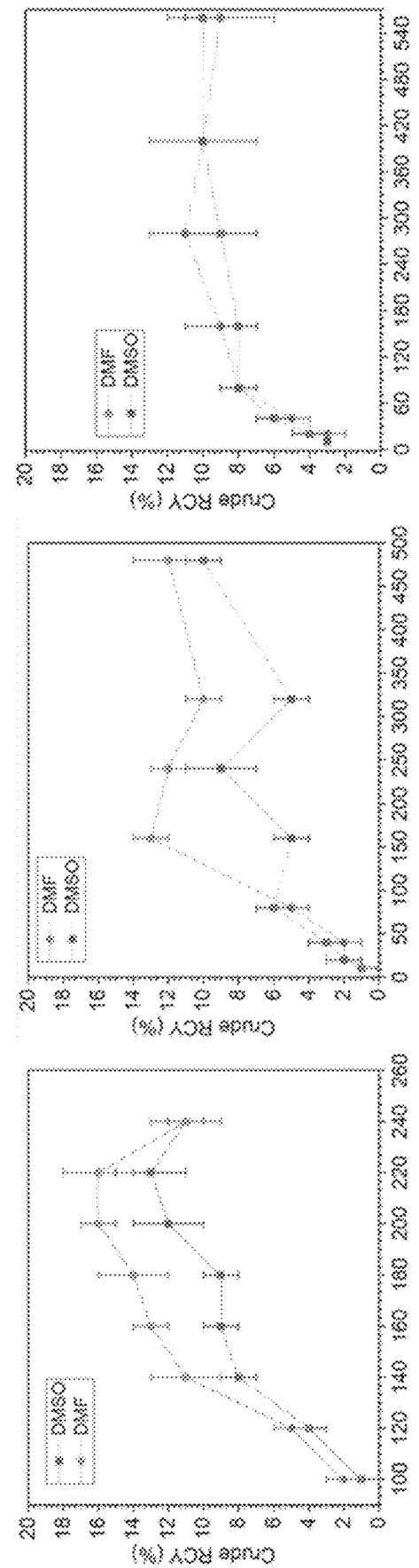
FIG. 19A  FIG. 19B  FIG. 19C
FIG. 19D  FIG. 19E  FIG. 19F

SYSTEM AND METHOD FOR HIGH-THROUGHPUT RADIO THIN LAYER CHROMATOGRAPHY ANALYSIS

RELATED APPLICATION

This Application is a U.S. National Stage filing under 35 U.S.C. § 371 of International Application No. PCT/US2020/028362, filed on Apr. 15, 2020, which claims priority to U.S. Provisional Patent Application No. 62/838,874 filed on Apr. 25, 2019, which is hereby incorporated by reference in its entirety. Priority is claimed pursuant to 35 U.S.C. §§ 119, 371 and any other applicable statute.

STATEMENT REGARDING FEDERALLY SPONSORED RESEARCH AND DEVELOPMENT

This invention was made with government support under Grant Numbers CA212718, EB002101 and MH097271, awarded by the National Institutes of Health. The government has certain rights in the invention.

TECHNICAL FIELD

The technical field generally relates to devices and methods used to analyze radio thin layer chromatography (radio-TLC) plates. More specifically, the technical field relates to devices and methods used to analyze radio-TLC plates that utilize optical imaging, including Cerenkov luminescence imaging (CLI), radioluminescence imaging, or scintillation-based imaging.

BACKGROUND

Thin layer chromatography (TLC) is a technique used to separate the chemical components of a mixture to identify its composition. This method was first used for the separation of alkaloids present in extracts from medicinal herbs. Now TLC has multiple uses ranging from analysis of purity and yield in chemical synthesis, separation of phospholipids in biological assays, and, in conjunction with a radiation detector, analysis of radiopharmaceuticals used for positron emission tomography (PET), single-photo emission computed tomography (SPECT), or targeted radiotherapy. In particular, radio-TLC is useful as a means to measure the conversion of radionuclide incorporation into the target radioactive product during synthesis development and optimization: its use is further extend as a quality control (QC) testing of the final formulated radiopharmaceutical to ensure radiochemical purity and radiochemical identity before administering to patients. Radio-high-performance liquid chromatography (radio-HPLC) is another chromatography technique for QC testing, and is particularly useful when distinct separation of multiple compounds is needed. However, in many radiopharmaceutical analysis applications, radio-TLC is sufficient and is preferred over radio-HPLC due to its simplicity, quantitative accuracy (e.g., retention of fluoride-18 on the HPLC column affects the quantitative accuracy of radio-HPLC), relatively short measurement time, and low need for maintenance.

Generally, a small amount of the sample is spotted near one end of the TLC plate, and then the edge of the plate is immersed in a solvent to "develop" the TLC plate. As the solvent flows up the TLC plate due to capillary action, the sample is separated into multiple spots each corresponding to a chemical component of the sample. After developing, the plate is dried and analyzed. Typically, a developed silica TLC plate will be analyzed using a radio-TLC scanner, in which a radiation detector is moved along the plate to obtain measurements of emitted radiation as a function of distance along the plate, which can then be expressed as a chromatogram. Most radio-TLC scanners (e.g., AR-2000, Eckert & Ziegler) use gas-based radiation detectors that are sensitive to gamma radiation as well as beta particles. Downsides of such systems are high cost, and the requirement for continuous supply of gas as well as periodic calibrations. Other radio-TLC scanners (e.g., miniGITA, Raytest) are based on crystal scintillators and photodiodes that do not require a gas supply but are also expensive. Sometimes, different detectors can be installed depending on the radionuclides of interest, and collimators can be added to improve spatial resolution of gamma detection (at the expense of sensitivity). Typically, the TLC plates used are 60-100 mm long and typically take 10-30 min to develop. The length of the TLC plate is needed both to achieve adequate chemical separation and provide enough readout resolution. The scanning time depends on activity level, but typically 1-3 min is sufficient to analyze the TLC plate.

There is a current need to develop high-throughput radio-labeling methods for optimization of synthesis conditions or preparation of compound libraries, resulting in the need to perform significant numbers of TLC separations and analyze the resulting TLC plates, requiring significant time for development and scanning. Though some scanners, e.g., AR-2000, have space to install multiple TLC plates which can be scanned automatically in sequence, the overall developing and analysis time still remains long. To reduce the readout time, alternative approaches for readout of TLC plates exist. Other than scanning detectors, several techniques have been used to more efficiently read radio-TLC plates. One such technique is electronic autoradiography. Such systems, e.g., Instant Imager (Canberra Packard) have a large-area multiwire proportional counter detector, on which multiple radio-TLC plates can be imaged simultaneously. While shown to be convenient, accurate, and able to image a wide range of isotopes (Tc-99m, I-124, F-18, Cu-64, C-11), the readout system is far more expensive than other approaches. Radio-TLC plates have also been imaged in a more cumbersome two-step process by first exposing a phosphor screen that is subsequently scanned with a phosphor imaging system (e.g., Perkin Elmer Cyclone Plus). Additional types of detectors have been used for simultaneous readout at multiple positions along a TLC plate thus avoiding the need for scanning. For example, using a 64×1 array of scintillator crystals above a photodiode array, Jeon et al. quantified samples spotted at multiple locations with different radioisotopes (Tc-99m, F-18) and found excellent agreement with an AR-2000 scanner. See Jeon, S. J. et al., Pixelated Scintillator-Based Compact Radio Thin Layer Chromatography Scanner for Radiopharmaceuticals Quality Control. *J. Instrum.* 2017, 12 (11), T11003. https://doi.org/10.1088/1748-0221/12/11/T11003.

In another example, Maneuski et al. used a pixelated solid-state Timepix silicon detector to obtain a 2D image of a partial radio-TLC plate spotted with an unspecified $^{18}$F-containing compound; however the detector size is small and multiple detectors would be needed to image a full radio-TLC plate or multiple plates, resulting in a high instrument cost. See Maneuski, D. et al., On the Use of Positron Counting for Radio-Assay in Nuclear Pharmaceutical Production. *Appl. Radiat. Isot.* 2017, 125 (Supplement C), 9-14. https://doi.org/10.1016/j.apradiso.2017.03.021.

A more scalable approach is Cerenkov luminescence imaging (CLI) in which radiation is detected indirectly via Cerenkov light emission, and the overall detection area can be scaled with a suitable optical system rather than larger detector. CLI-based detection of compounds containing a wide variety of radionuclides has been demonstrated, including H-3, C-11, C-14, F-18, P-32, Cu-64, Ga-68, I-124, and I-131. Originally reported as a method to observe radioactivity in microfluidic chips, CLI is also used for in vivo optical imaging, intraoperative imaging, and has been reported for readout of radio-TLC plates. See Park, J. et al., Luminescence Imaging Using Radionuclides: A Potential Application in Molecular Imaging. Nucl. Med. Biol. 2011, 38 (3), 321-329 (radio-TLC plates). One of the attractive features is that this technique can be used for imaging of 0-particles (mostly involved in therapeutic applications in cancer), which do not emit gamma rays (as occurs after positron emission) and thus are not easily imaged by systems based on gamma detection.

Park et al. reported a proof-of-concept demonstration in 2011, showing the possibility to use a commercial small-animal luminescence imaging system (IVIS 200, Caliper Life Sciences) to perform CLI of a developed radio-TLC plate spotted with an unspecific mixture of $^{131}$I-containing compounds. The quantified percentage of luminescence in each of four ROIs compared favorably to the analysis using a conventional radio-TLC scanner (AR-2000). Furthermore, the CLI approach augmented the resolution between separated species and the imaging could be performed rapidly (1 min). Using a custom-built optical imaging system, Spinelli et al. later showed that the imaging time of radio-TLC plates with spotted samples of [$^{68}$Ga]Ga-DOTANOC (7 kBq) could be reduced (compared to CLI) by placing the plates in contact with a phosphor-containing intensifying screen. See Spinelli et al., Unified Approach for Bioluminescence, Cerenkov, β, X and γ Rays Imaging. Biomed. Opt. Express 2015, 6 (6), 2168-2180. Recently, Ha et al. investigated the effect of different types of TLC plates (differing backing materials, stationary phase type and thickness, and addition of fluorescent indicator) by placing multiple spots of various radioisotope solutions (e.g., H-3, P-32, I-124, and I-131) on TLC plates, imaging these plates directly and quantifying relative intensity between spotting locations, showing the possibility to significantly increase the CLI signal and sensitivity. See Ha, Y. et al., Visualization and Quantification of Radiochemical Purity by Cerenkov Luminescence Imaging. *Anal. Chem.* 2018, 90, 15, 8927-8935. An interesting feature of this work was a demonstration that multiple radio-TLC plates (16) could be positioned within the large field of view of the small animal scanner (IVIS Spectrum or IVIS Lumina II, Caliper) for simultaneous imaging, and thus speeding the readout when multiple plates are analyzed. However, the high cost (an order of magnitude higher than a conventional radio-TLC scanner) and large size of the small animal scanners may not be practical for many radiochemistry laboratories. Notably, Ha et al. did not perform developing of the TLC plates (i.e., did not perform sample separations). It can be assumed that this step would be very time-consuming and cumbersome for a large number of TLC plates, and that this time and effort would dominate the overall radio-TLC analysis process.

SUMMARY

In one embodiment, a system and method for the complete analysis of radio-TLC plates is disclosed (both separation and readout) in a high-throughput, time- and labor-efficient manner. This is accomplished by leveraging the high resolution of CLI and optimizing the sample volume to enable multiple samples to be spotted close together on the same TLC plate. All samples can be rapidly developed in parallel (leveraging the high imaging resolution to enable dense placement of samples as well as very short separation distances) and then read out simultaneously using a compact, low-cost Cerenkov imaging system. The system and method of been used for the high-throughput radio-TLC analysis of complex mixtures of $^{18}$F-labeled and $^{177}$Lu-labeled radiopharmaceuticals including (S)—N-((1-Allyl-2-pyrrolidinyl)methyl)-5-(3-[$^{18}$F]fluoropropyl)-2,3-dimethoxybenzamide ([$^{18}$F]fallypride), [$^{18}$F]fluoroethyl-tyrosine ([$^{18}$F]FET), [$^{177}$Lu]Lu-PSMA-617, [$^{18}$F]Flumazenil, and [$^{18}$F]Florbetaben for assessment of radiochemical purity or reaction conversion. Interestingly, the Cerenkov imaging readout clearly showed small impurity peaks that were not discernable with a conventional radio-TLC scanner (miniGITA) and was able to identify anomalies in the spotting/separation process that also would not be apparent when using a conventional scanner and resulted in superior accuracy and precision compared with conventional radio-TLC scanning.

The invention leverages the advantages of the CLI to enable the high-throughput readout of radio-TLC plates in short time. One main application of the invention is for optimization of synthesis conditions or preparation of compound libraries, which requires to analyze significant numbers of samples. If each sample is analyzed via a separate TLC plate, this would require significant time for development and scanning of each plate. By spotting multiple samples on one plate, all samples can be separated via a single developing process and all can be analyzed via a single readout process, saving significant amounts of time and effort. Furthermore, the high spatial resolution of CLI imaging enables shorter separation distances to be used while maintaining adequate separation between different chemical species. The invention also works for the analysis of radiotracers labeled with radionuclides that are positron emitters (F-18, Cu-64, Zr-89, I-124) used for PET imaging and radiopharmaceuticals labeled with beta emitters (e.g., I-131, Lu-177). The rapid analysis time of multiple samples via parallel development and parallel CLI readout could be especially useful in conjunction with very short-lived isotopes such as C-11 (half-life 20.4 min).

In one embodiment, samples of crude radiopharmaceuticals (or other radiochemical-containing samples) are deposited with a micropipettor or other dispenser about 15 mm from the edge of the TLC plate and allowed to dry. Deposited volume can be 1.0 µL or less. In one specific implementation, four (4) samples are spotted on each 50 mm×60 mm TLC plate along the 50 mm edge at 1 cm spacing so that four (4) "lanes" would be formed during development. In another embodiment, eight (8) samples are spotted at 0.5 cm spacing (i.e., pitch) on 50 mm×35 mm TLC plates. Then, the spotted TLC plate was developed in the mobile phase. Samples at all lanes were separated at the same time. Of course, larger numbers of samples may be loaded on a single TLC plate. For example, samples could be spotted closer together, or a larger TLC plate could be used (provided it fits within the field of view of the readout system).

The TLC plates where then dried. After drying, the plates were imaged for 5 min with a Cerenkov luminescence imaging device that includes a light-tight chamber and cooled camera. Briefly, the radio-TLC plate was placed in the light-tight chamber, covered with a transparent substrate (such as glass, or scintillator in other embodiments), and Cerenkov light was detected by a scientific cooled camera (QSI 540, Quantum Scientific Imaging, Poplarville, MS) equipped with a 50 mm lens (Nikkor, Nikon, Tokyo, Japan). The temperature of the camera was maintained at −10° C. for dark current reduction. The field of view (FOV) was 50×50 mm$^2$.

The raw image comprised an array of values (analog-to-digital units; ADUs) corresponding to detected light at each pixel location. Using custom-written MATLAB software, images were first processed with three corrections, including CCD dark current and bias level correction, lens vignetting and CCD pixel nonuniformity correction, and 3×3 median filtering. In addition, background subtraction was performed by selecting an area of the image not containing radioactive sample, computing the average pixel value, and subtracting this average from the pixel values across the whole image. Regions of interest (ROIs) were drawn on this final corrected image to enclose the radioactive regions/spots. In some embodiments, these ROIs are drawn manually. In other alternative embodiments, image processing software may be used to automatically identify ROIs. Each ROI was integrated, and then the fraction of the integrated signal in that ROI (divided by the sum of integrated signal in all ROIs corresponding to the same "lane") was computed.

When using 5 min acquisitions, the corresponding limit of detection (LOD) and limit of quantification (LOQ) for the system described herein were determined to be 0.8 kBq/μL and 2.4 kBq/μL, respectively, for 1 μL spots of fluoride-18, and the linear range extended up to 21.3 MBq. The LOD could be further reduced by replacing the glass cover with a thin scintillator. The greater separation resolution of CLI was readily apparent: in fact, a low-abundance side product (6±0% of activity, n=2) was easily visible in the CL images (showing three distinct regions for both samples), but was not clearly discernable or quantifiable using the radio-TLC scanner software (showing only two clear peaks for each sample). Aside from the cleaner separation and better resolution, the CLI-based method also had the benefit of faster analysis. The total imaging time for the whole plate (5 min) is independent of the number of samples, while additional scanning time is needed for each strip cut from the radio-TLC plate if using a conventional radio-TLC scanner (4×3 min=12 min). The imaging time per plate could be reduced by spotting more radioactivity per sample, using a scintillator cover (instead of glass plate), etc.

To further increase the sample throughput, the size of the radio-TLC plates could be further reduced to allow multiple plates to fit within the field of view of the imaging system or camera. In one specific embodiment, the separation of eight (8) crude samples of [$^{18}$F]Fallypride was demonstrated, with a separation distance of only 15 mm (compared to a more typical distance of 55 mm or more). (Up to 16 samples would fit in the field of view.) The high resolution of CLI images enabled clear separation and accurate quantification compared to the chromatograms obtained with the radio-TLC scanner. In addition to being able to fit a larger number of samples in the CLI system field of view, the plate could be developed more quickly (i.e., 2.5 min for the 15 mm separation distance vs. 8 min for 35 mm separation), saving considerable additional analysis time. Note that all samples were spotted on the same TLC plate and developed together (i.e., in parallel). Relatively simple changes to the optical system such as use of different lenses would allow an increase in the field of view (currently ~5×5 cm) to allow visualization of more samples simultaneously.

One notable advantage of the Cerenkov imaging technique versus radio-TLC scanning is the ability to see a high-resolution 2D image of the final separation. This can be used to monitor the quality of the spotting and developing process.

To explore the application of CLI-based radio-TLC analysis to additional isotopes, labeling yield of [$^{177}$Lu]Lu-PSMA-617 was measured as a function of reaction time by sampling 2 μL crude product at different time points and spotting on a TLC plate. The results of CLI analysis suggested that high labeling efficiency (99%) can be achieved in just 10 min, rather than the typical 30 min timeframe used (FIGS. 9A and 9B).

In one embodiment, a method of performing high-throughput radio thin layer chromatography (radio-TLC) includes the operations of: spotting a plurality of locations on a first thin layer chromatography (TLC) plate with samples containing a radiochemical or a radiopharmaceutical, each location defining an individual lane on the first TLC plate for the respective samples; drying the samples on the first TLC plate; developing the first TLC plate with a developing solution so as to simultaneously separate the samples; drying the developed first TLC plate; and imaging the dried first TLC plate with a Cerenkov luminescence imaging device comprising a light-tight chamber and a camera, wherein the image obtained from the Cerenkov luminescence imaging device comprises a field of view that contains regions of interest from the plurality of lanes containing the samples.

In another embodiment, a method of performing high-throughput radio thin layer chromatography (radio-TLC) includes the operations of: spotting a plurality of locations on multiple thin layer chromatography (TLC) plates with samples containing a radiochemical or a radiopharmaceutical, each TLC plate spotted at a plurality of locations with each location defining an individual lane on the respective TLC plate for the samples; drying the samples on the multiple TLC plates; developing the multiple TLC plates with a developing solution so as to simultaneously separate the samples; drying the multiple developed TLC plates; and imaging the multiple TLC plates simultaneously with a Cerenkov luminescence imaging device comprising a light-tight chamber and a camera, wherein the image obtained from the Cerenkov luminescence imaging device comprises a field of view that contains regions of interest from the plurality of lanes containing the samples from the multiple TLC plates.

In another embodiment, a method of performing high-throughput radio thin layer chromatography (radio-TLC) includes the operations of: spotting a plurality of locations on one or more thin layer chromatography (TLC) plates with samples containing a radiochemical or a radiopharmaceutical, each location defining an individual lane on the one or more TLC plates for the respective samples; drying the samples on the one or more TLC plates; developing the one or more TLC plates with a developing solution so as to simultaneously separate the samples; drying the one or more developed TLC plates; imaging the dried one or more TLC plates with an imaging device comprising a camera, wherein the image obtained from the camera comprises a field of view that contains regions of interest from the plurality of lanes containing the samples; and automatically identifying regions of interest from the plurality of lanes in the image obtained with the camera with image processing software.

The system and method disclosed herein offers several advantages over other state-of-the-art high-throughput read-out methods for radio-TLC plates including, but not limited to, the following:

High resolution of the image. This advantage enables the high-throughput readout (i.e., different samples can be placed closer beside one another; and a shorter separation length is sufficient to achieve separation, thereby decreasing the separation time) and can be used to monitor the quality of the spotting and developing process. The physical resolution is limited by the positron range of the radioisotope. However, the resolution of the camera is relevant depending on the optical system and field of view. If a larger field of view is desired, the camera resolution can be increased to preserve the same physical resolution on the TLC plate.

High sample throughput on the single TLC plate. By spotting multiple samples on one TLC plate, developing the samples simultaneously and imaging the samples simultaneously with the CLI setup, the labor and time to perform the analysis is reduced, and there is lower variability in the analysis results. (Variability tends to be caused by operation error, and the likelihood of variability is high if a large number of individual TLC plates need to be spotted and developed and imaged back to back.)

Short separation distance. High resolution of Cerenkov Luminescence Imaging enables clear separation and accurate quantification even with much shorter separation distance (15 mm) compared to the general separation distance (55-80 mm) typically used. Short developing distance results in the reduction of the size of the radio-TLC plates, thus, multiple plates are allowed to fit within the field of view. In addition, the shorter separation distance can be developed much quicker as the speed of the solvent front progressively decreases the longer the TLC plate is.

Time efficient. Many samples can be analyzed in a short period of time. For example, a TLC plate spotted with up to eight (8) samples can be developed and imaged at the same time, which enables 96 samples can be analyzed within one hour while it takes many hours for analyzing with the conventional radio-TLC scanner. TLC spotted plates with even higher numbers of samples enables even higher throughput.

Easily scalable throughput. The overall detection area can be scaled with a suitable optical system rather than larger detector, which costs more if change is needed. Multiple plates can fit within the detection area to increase the throughput. In some embodiments, multiple TLC plates are imaged simultaneously with the camera. The camera described herein is, in one embodiment, a cooled CCD camera but in other embodiments, other high sensitivity cameras could be employed that do not need to be cooled. The camera may also, optionally, be used to capture brightfield images of the TLC plates. Thus, the camera may be used to capture CLI images as well as brightfield images of the sample. The brightfield images can capture markers such as the "origin" for each sample and the final location of the solvent front, which are relevant for computing retention factors (Rr values) for the different ROIs within a lane.

BRIEF DESCRIPTION OF THE DRAWINGS

FIG. 8A illustrates a Cerenkov image of a developed plate after spotting of two replicates (1 μL) each of crude [$^{18}$F]FET product. This image indicates a normal spotting and developing process.

FIG. 8B illustrates a Cerenkov image showing separation artifacts visible in most distant spots when the plate was not completely dried prior to developing.

FIG. 8C illustrates a Cerenkov image showing separation artifacts due to a combination of incomplete drying as well as abnormally large sample volume (right spot 2.0 μL).

FIG. 8D illustrates a Cerenkov image showing separation artifacts arising from liquid contamination at the right edge of the TLC plate during developing, causing the main solvent flow to be deflected to the left. The TLC plate in this case was spotted, at the positions marked with dash circles, with two replicates (1 μL each) of crude [$^{18}$F]fallypride product.

FIGS. 11A, 11B—a dilution series of [$^{18}$F]fluoride solution was deposited (1 μL each spot) on two TLC plates and imaged. Each spot was replicated n=4 times but only one representative of each dilution is shown. FIG. 11C shows the integrated signal was plotted as a function of deposited activity. A weighted linear least squares fit was performed to determine the minimum detectable activity ($R^2$=0.99998). Note that the linear fit appears non-linear on the log-log plot due to the non-zero intercept. The non-zero intercept arises as the background subtraction procedure is not perfect. Note that, if needed, the LOD can be easily modified.

FIGS. 14A-14D illustrate the analysis of maximum detectable activity. A dilution series of [$^{18}$F]fluoride solutions was prepared and spotted (1 μL each) onto radio-TLC plates. An initial stock solution with concentration 20700 kBq/μL was prepared. The first plate (FIG. 14A) contained samples of 20700 kBq, 10400 kBq, and 5180 kBq (top to bottom). The second plate (FIG. 14B) contained samples of 2210 kBq, 1110 kBq, and 553 kBq. The third plate (FIG. 14C) contained samples of 256 kBq, 129 kBq, and 64 kBq. All values were decay-corrected to the start time of imaging. The data (FIG. 14D) are plotted (n=2 each point) and weighted linear least squares fit was performed ($R^2$=0.99996) to determine the linear range. Theoretical limit is determined by multiplying the number of pixels in the ROI (2604) by the maximum possible pixel value from CCD camera ($2^{16}$=65536).

FIGS. 19A-19F illustrate the optimization results of reaction conditions on fluorination efficiency (FIGS. 19A-19C) and crude radiochemical yield (RCY) (FIGS. 19D-19F) for temperature, base mount, and precursor concentration for the synthesis of [$^{18}$F]Flumazenil.

DETAILED DESCRIPTION OF THE ILLUSTRATED EMBODIMENTS

Figure 1:
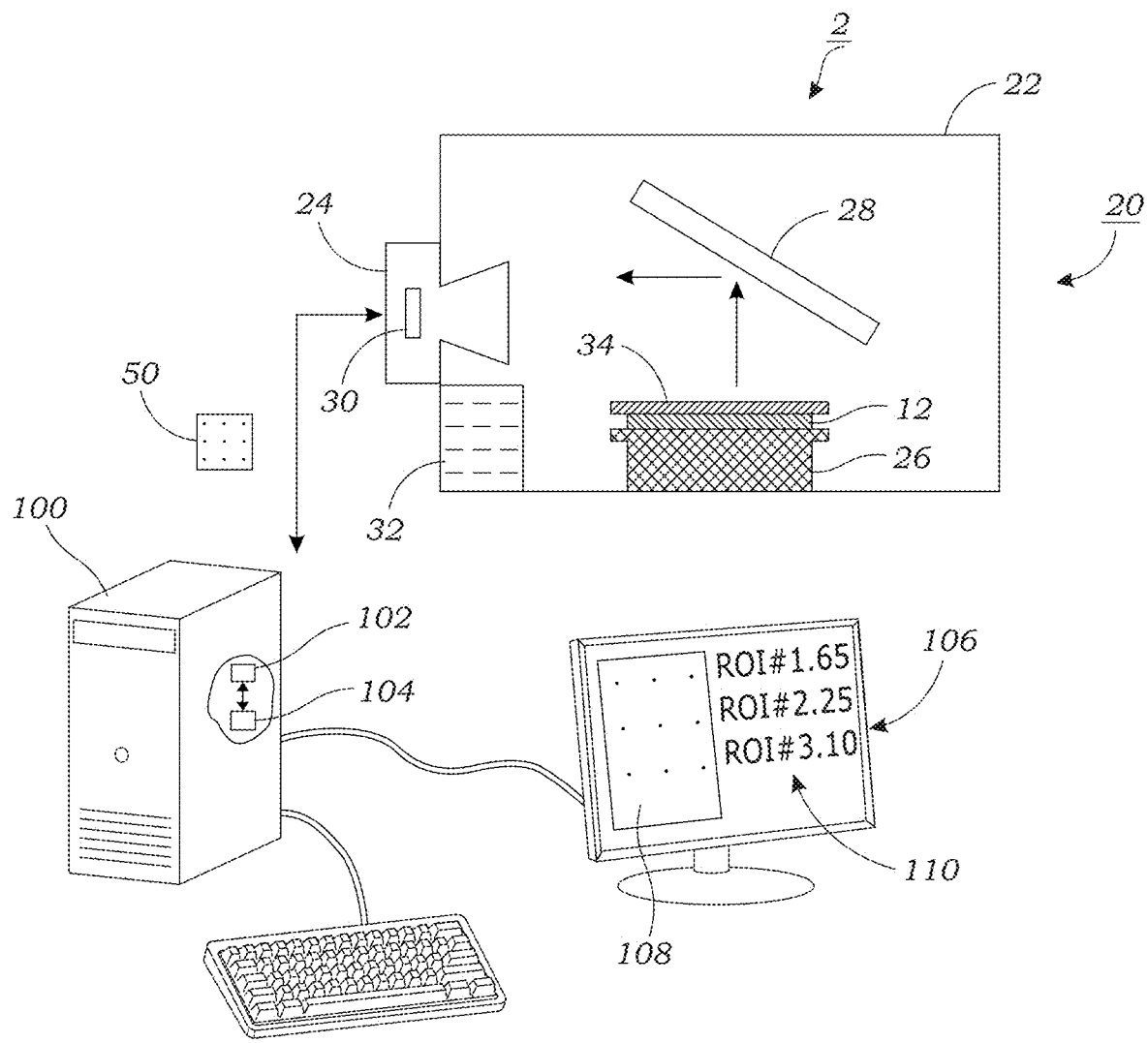
FIG. 1 schematically illustrates system for imaging radio-TLC plates that utilize Cerenkov luminescence imaging (CLI) according to one embodiment.
Figure 2:
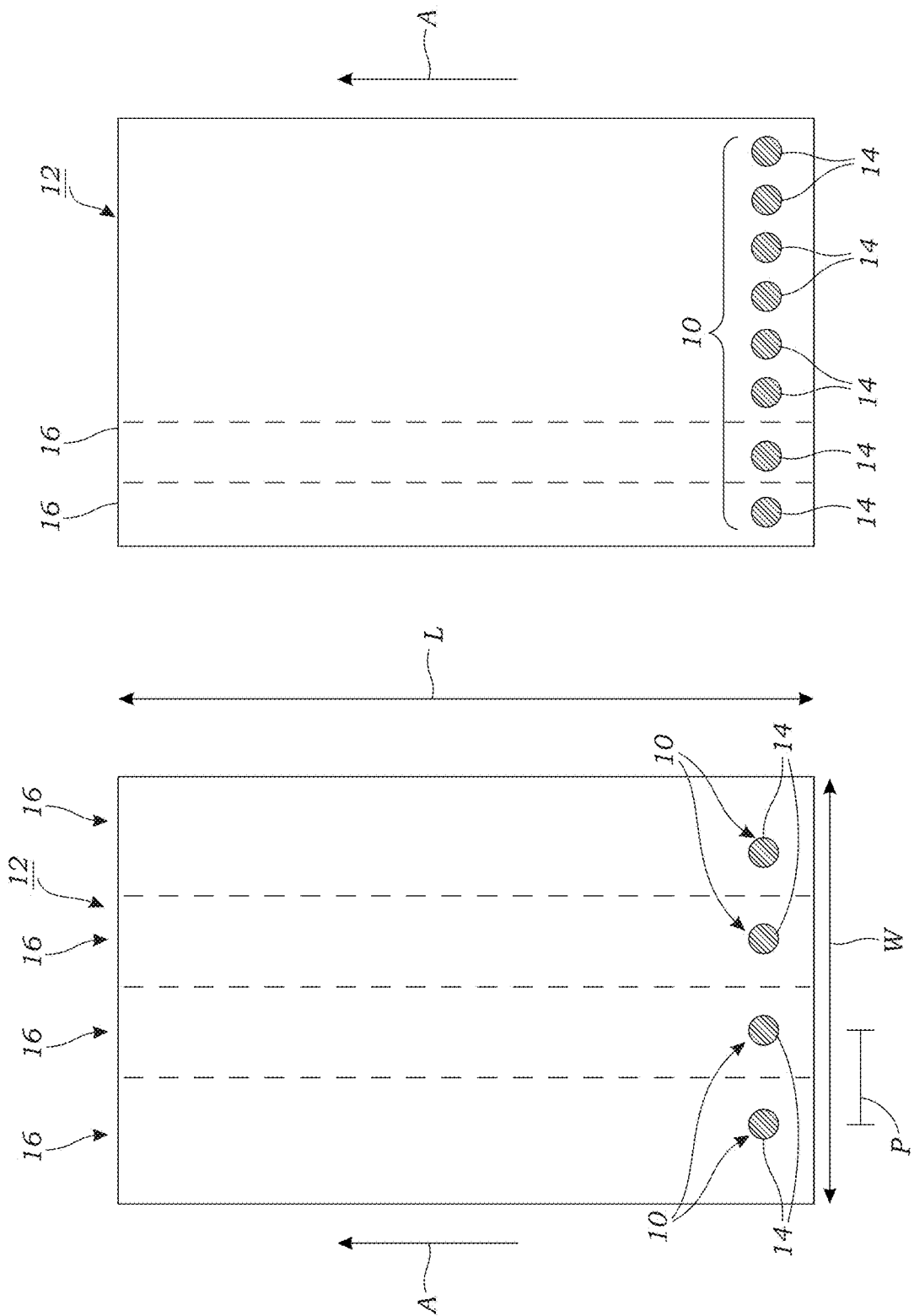
FIG. 2A illustrates a TLC plate that has been loaded with four (4) samples. Each sample is spotted at a discrete location on the TLC plate that is then developed in its own dedicated lane.
FIG. 2B illustrates another TLC plate that has been loaded with (8) samples.

According to one embodiment and with reference to FIGS. 1 and 2A, 2B, a system 2 and method is disclosed for performing high-throughput radio thin layer chromatography (radio-TLC) at a plurality of spotting locations 10 on one or more thin layer chromatography (TLC) plate(s) 12 with samples 14 containing a radiochemical or a radiopharmaceutical at the spotting locations 10. The radiochemical or a radiopharmaceutical may include a positron emitter, a beta emitter, or an alpha particle emitter. The radiochemical or a radiopharmaceutical is typically within a solvent (fluid) that may include, for example, (i) an injectable buffer such as water, saline, or phosphate-buffered saline possibly containing additives for preservation, radiolytic stability (e.g., ethanol, sodium ascorbate, etc.), or solubility (e.g., ethanol, polyethylene glycol, dimethylsulfoxide, etc.), (ii) an organic reaction solvent or solvent mixture (e.g., acetonitrile, dimethylsulfoxide, dimethylformamide, ethanol, methanol, t-hexyl alcohol, t-butanol, toluene, dichlormethane, chloroform, dioxane, etc.), or an aqueous reaction solvent (e.g., acid or basic solution). TLC plates 12 are chromatography devices that are used to separate chemical species. The TLC plate 12 includes a backing material such as glass, plastic, or aluminum foil along a thin layer of adsorbent material. The adsorbent material may include silica gel, aluminum oxide, or cellulose (e.g., paper). The adsorbent may contain, in some embodiments, a fluorescent dopant to increase light output. TLC plates 12 are sold commercially. Samples 14 are spotted in small volumes (generally less than about 1 μL) near the edge of the TLC plates 12 either manually (using a pipette, syringe, or the like) or automatically using an automatic sampler device (e.g., non-contact dispensers).

Referring to FIGS. 1, 2A, 2B, and 3 each spotted location 10 on the TLC plate 12 is located in a discrete lane 16 during the developing process as explained herein. The TLC plate 12 has a length (L) and a width (W) with the spotted locations 10 being located adjacent to an edge of the TLC plate 12. The dimensions of the TLC plate 12 but is generally less than 1,800 mm². Each lane 16 is an elongate region on the TLC plate 12 that contains the separate chromatography components from a single spotted location 10. The number of such lanes 16 (and spotted locations 10) may vary but may include 2, 3, 4, 5, 6, 7, 8, 9, 10, or more lanes per TLC plate 12. In some embodiments, a barrier material may be incorporated into or placed on the TLC plate 12 to separate adjacent lanes 16. The barrier material would be placed at the midpoint between adjacent spotted locations 10. For example, a line or divider that is formed from a material that inhibits or prevents the passage of certain liquid types may be used to ensure that the sample in each spotted location 10 and/or the contents thereof stay in the single lane during separation. The barrier material may include a hydrophobic waxy material or polymeric ink that can block the flow of aqueous liquids as one example. This barrier material may extend partially or entirely through the thickness of the TLC plate 12. For example, it could be painted, drawn, or otherwise deposited on the surface of the TLC plate 12.

The spotted location 10 is typically located adjacent to one end of the TLC plate 12. Typically, this is several millimeters (e.g., around 15 mm) from the edge of the TLC plate 12 so that the samples 14 are not submerged in the developing solution (i.e., mobile phase) when the edge of the TLC plate 12 is exposed to the developing solution. After placing the samples at the spotted location 10, the TLC plate(s) 12 is/are allowed to dry. This drying takes place at ambient or room temperature conditions as only about 0.5 to about 1 μL of solution needs to be evaporated. After drying, the TLC plate(s) 12 are then developed with a developing solution followed by drying of the TLC plate 12. The developing solution is selected based on the expected sample composition as well as the type of material that makes up the stationary (adsorbent) phase of the TLC plate 12 itself. The mobile phase is typically an organic solvent, mixture of solvents, or aqueous buffer. For example, [$^{18}$F]fallypride samples were separated using 60% MeCN in 25 mM $NH_4HCO_2$ with 1% TEA v/v, [$^{18}$F]FET samples were separated using 80:20 v/v MeCN and water mixture, and [$^{18}$F]Flumazenil samples were separated using MeCN. Developing is usually performed in a covered glass container or jar in which a small depth of mobile phase is first poured. The TLC plate 12 is placed vertically in the container and the container is covered. The solvent front of the developing solution moves in the direction of arrow A. Developing of the TLC plates 12 may take several minutes. For example, in one embodiment, the TLC plates 12 are developed over 5 minutes or less. Other embodiments, may have even quicker development over 3 minutes or less.

Figure 3:
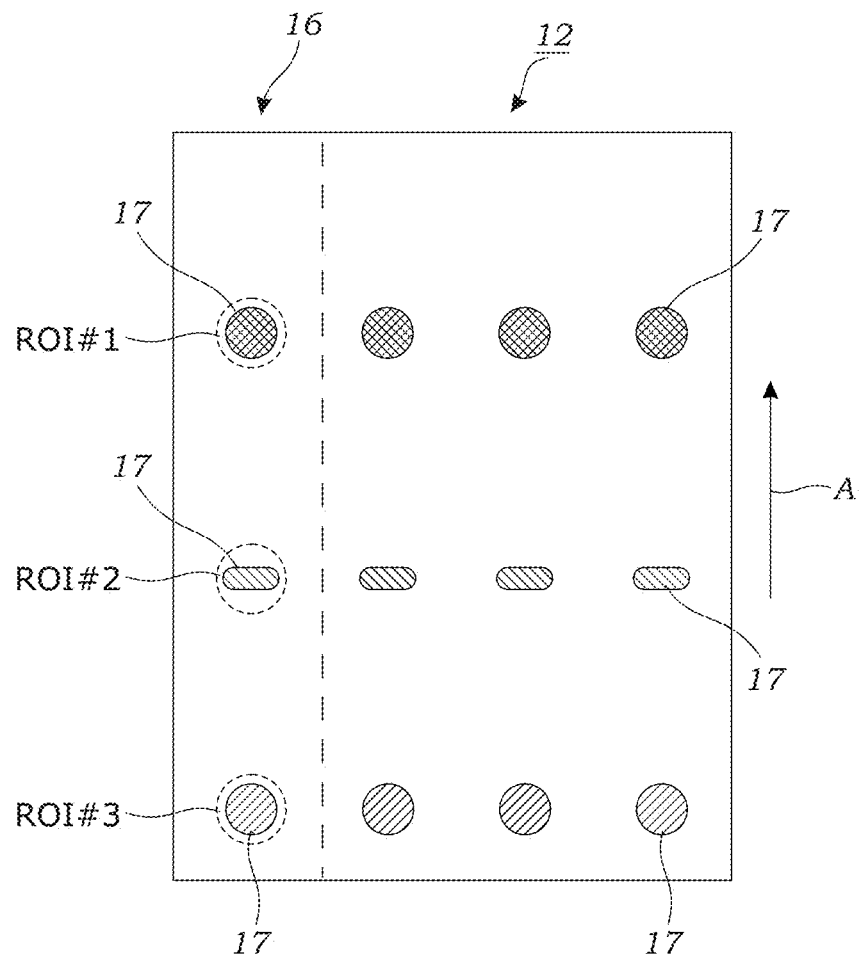
FIG. 3 illustrates an exemplary view of a Cerenkov image of a developed TLC plate. Three different regions of interest (ROIs) are illustrated. Arrow A indicates flow direction of the front of the developing solution.

Once the solvent front reaches a predefined distance up the TLC plate 12, the TLC plate 12 is removed from the mobile phase and allowed to dry under ambient conditions. If it is known that the sample does not contain volatile species, the drying may be accelerated by gently using a heat gun. In some embodiments, the separation distance within the lane(s) 16 is short, namely between 15 mm and 35 mm. This is the "active" length of the lane(s) 16 where separation occurs even if the physical length (L) of the lane is longer. The dried TLC plates 12 are then imaged with a Cerenkov luminescence imaging device 20 as seen in FIG. 1 comprising a light-tight chamber 22 and a camera 24, wherein the image obtained from camera 24 comprises a field of view that contains a plurality of regions of interest (ROIs) from the different lanes 16 of the TLC plate(s) 12 that contain radioactive spots 17. These spots 17 may contain a reactant, reaction product, byproduct, intermediate, or impurity, for example. FIG. 3 illustrates three such ROIs (ROI #1, ROI #2, ROI #3) in a single lane 16. Multiple ROIs, either within a single lane 16 or across multiple lanes 16 are captured within the image obtained from the camera 24. As explained herein, the intensity of the spots 17 formed in each ROI may be used to measure reaction efficiency associated with each sample 14. The intensity of the spots 17 in each ROI is used as a proxy for the radioactivity concentration at each particular spot 17 location. This may be used to assign a fraction or percentage of the total radioactivity for each spot 17 location. Each spot 17 location or ROI corresponds to a particular reactant, product, intermediate product, impurity, or the like. These can be assigned fractions or percentages to judge the reaction efficiency that was used for the particular sample 14. For example, ROI #1 may have a percentage of 65%, while ROI #2 may have a percentage of 25%, and ROI #3 may have a percentage of 10%. Each ROI percentage value is based on the total measured intensity (proxy of radiation) for that particular spot 17 or ROI as a function of all spots 17 or ROIs in a single lane 16.

In some embodiments, the method involves imaging a single TLC plate 12 containing a plurality of samples 14 spotted thereon at different locations 10. In other embodiments, the method involves imaging multiple TLC plates 12 simultaneously with each TLC plate 12 containing a plurality of samples 14 spotted thereon at different locations 10. Multiple TLC plates 12 would be loaded on the support platform 26 as explained herein. The TLC plates 12 may be spotted with samples 14 containing a small separation distance or pitch (P) between adjacent samples as seen in FIG. 2A. This may include a minimum separation distance or pitch (P), in some embodiments, of 5 mm although this minimum separation distance is a function of spotting volume. Generally, smaller spotting volumes may achieve smaller separation distances. The pitch distance (P) may be substantially equal for all samples 14 on the TLC plate 12. In some embodiments, the spotted sample 14 may include about 1 μL or less of sample 14. In still other embodiments, the spotted sample 14 may include about 0.5 μL or less of sample 14.

After the TLC plate(s) 12 have been spotted, developed, and dried, they are placed inside a Cerenkov luminescence imaging device 20. The Cerenkov luminescence imaging device 20 includes a light-tight enclosure or housing 22, as seen in FIG. 1 that contains a sample holder or support platform 26 that holds the TLC plate(s) 12 within a light-tight enclosure or housing 22. A mirror 28 is used to create a folded optical path as illustrated in FIG. 1 by the arrows to the camera 24. The camera 24 includes an image sensor 30 therein such as a charge-coupled device (CCD) image sensor 30. A lead brick 32 is also located in the light-tight enclosure or housing 22 so as to reduce noise by decreasing the number of gamma rays that interacted directly with the CCD image sensor 30 leading to noise that does not originate from Cerenkov luminescence from the TLC plate 12. In one alternative embodiment, two separate cameras 24 are used with one camera 24 used to obtain Cerenkov luminescence images of the TLC plate 12 while a second separate camera 24 (not illustrated) is used to obtain brightfield images of the TLC plate 12. It should be appreciated, however, that in another alternative embodiment, a single camera 24 can obtain both Cerenkov luminescence images and brightfield images of the TLC plate 12. In some embodiments, the TLC plate(s) 12 is covered by glass 34 although the TLC plate(s) 12 may instead be covered with a scintillator. In one embodiment, the camera 24 is a scientifically cooled CCD-containing camera (using a Peltier thermoelectric cooler). The camera 24 used in the experiments described herein was such a camera 24 equipped with a 50 mm lens was used to assess the radioactive distribution throughout the synthesis process via Cerenkov emission.

The Cerenkov camera 24 was fixed to the light tight enclosure 22 in order (i) to maintain reproducible distance between the camera 24 and the TLC plate(s) 12 and (ii) to allow ventilation for camera cooling. The Cerenkov imaging camera's 24 field of view was set to be approximately 5×5 $cm^2$ although the particular FOV may be adjusted using a different optical lens. Exposure time was set to 300 seconds, although shorter times can be used via the addition of a scintillator or using higher activity samples. Temperature of the CCD image sensor 30 was set to −10° C. to reduce dark current. As seen in FIG. 1, the camera 24 may be operatively coupled to a computing device 100 that runs or executes image processing software 102 using one or more processors 104 that is used to analyze the acquired images 50. The computing device 100 may include personal computer, laptop, tablet PC, server, or the like. The image processing software 102 may be used to perform various error-correction or image processing operations such as those described herein. The image processing software 102 also has the ability to analyze the intensity of various regions of interest (ROIs) that are present in the imaged TLC plate(s) 12. The relative intensities of these ROIs may be used to analyze the samples 14. For example, the relative intensities may be used to ascertain the reaction yield for a particular sample 14. The relative intensity may also be used for quality control purposes, for example, to measure the radiochemical purity or to screen for impurities. The image processing software 102 may also be used to display images 108 of the TLC plate(s) 12 on a display 106 as seen in FIG. 1. For example, a graphical user interface (GUI) may be used to show a CLI image 108. Alternatively, or in addition to, a brightfield image 108 of TLC plate(s) 12 may also be shown (and in some embodiments superimposed on one another).

In one embodiment, the ROIs may be automatically identified by the user using the GUI or the like to manually identify ROIs. For example, the user may click or highlight (e.g., using a drop-down tool such as a circle or free-hand cursor) to select these ROIs in the displayed CLI image 108. In other embodiments, the image processing software 102 may automatically identify ROIs using, for example, edge detection, region growing or other known image segmentation techniques, or a combination of manual and/or automated segmentation. For example, the user could select a point in each 'spot' or ROI, and then the image processing software 102 uses 'region growing' to determine the full extent of the spot or ROI. Alternatively, the user could specify one or more Rr values (Rr is the distance a certain species has traveled divided by the total separation distance, i.e., how far the solvent front moved beyond the sample origin) for expected species and the image processing software 102 could search the image for spots near those distances. The image processing software 102 may also display analysis results 110. These may include the fraction or percentage of total radioactivity for each ROI within a lane 16. The image processing software 102 may be implemented in any of number of software programs or languages. For example, as explained herein, MATLAB was used as the image processing software 102.

Figure 4:
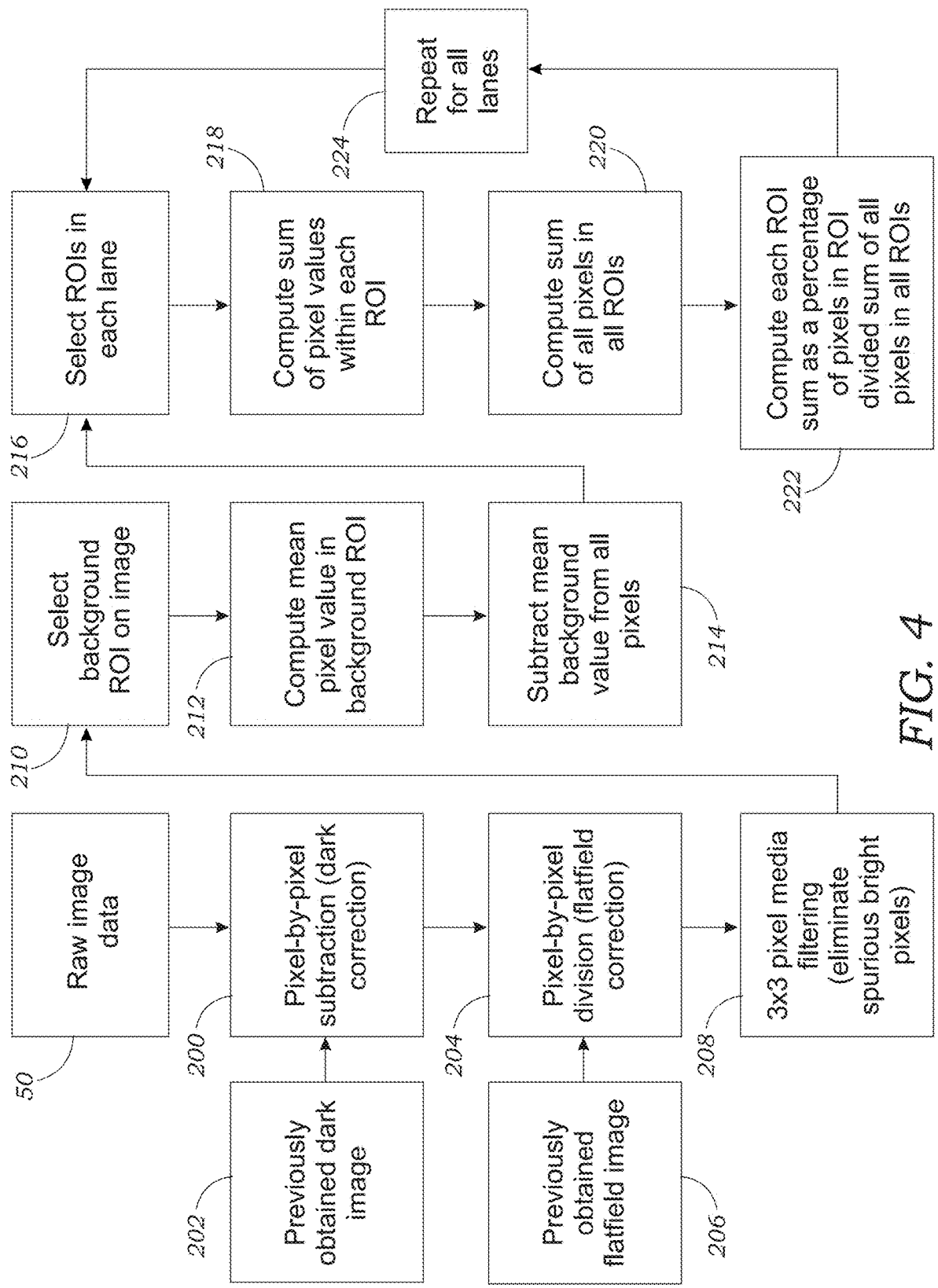
FIG. 4 illustrates an exemplary flow of operations used to process raw images obtained from the camera.

As explained herein, the image processing software 102 may perform various image processing operations prior to, for example, generating fraction or percentage of total radioactivity values for each ROI within a particular lane 16. FIG. 4 illustrates an exemplary flow of operations used to process raw images 50 obtained from the camera 24. As seen in FIG. 4, the raw image 50 from the camera 24 is first subject to a dark correction operation 200. For the dark correction operation 200, a previously obtained "dark" image 202 (obtained without any TLC plate(s) 12) is used to perform pixel-by-pixel subtraction in the dark correction operation 200. Next, the dark corrected image of operation 200 is subject to flatfield correction 204. Flatfield correction 204 cancels the effects of image artifacts by variations in the pixel-to-pixel sensitivity of the image sensor 30 and by distortions of the optical path (e.g., lens vignetting). For flatfield correction 204, a previously obtained flatfield image 206 is used to perform pixel-by-pixel division. Next, in operation 208, a 3×3 pixel media filtering operation is performed to eliminate bright pixels. In this filter operation 208 a block of nine (9) pixels are examined and a center pixel is assigned a value which is the median value of the nine (9) pixels.

Next, a background ROI of the filtered image is selected as seen in operation 210. This background ROI is selected from a region that does not contain any radioactive spots or signals. This background ROI may be manually selected by the user or, alternatively, the image processing software 102 may select a background ROI. Next, in operation 212, the mean pixel value (i.e., intensity values for each pixel are used) for the pixels in the ROI is determined. Next, in operation 214, the mean background value calculated in operation 212 is then subtracted from all pixels. For a particular lane 16, one or more ROIs is then selected as seen in operation 216. This may be a user selected ROI or the image processing software 102 may automatically select the ROIs. After the one or more ROIs is selected, a sum of the pixels (pixel intensity) within each ROI is then computed as seen in operation 218. For lanes 16 that contain a plurality of ROIs, in next operation 220, the sum of all pixels in all ROIs (within that particular lane 16) is computed. In operation 222, a percentage or fraction is then computed for each ROI where the percentage or fraction is the sum of pixels in that particular ROI divided by the sum of all pixels in all the ROIs in that particular lane 16. This process is then repeated for all of the different lanes as seen in operation 224.

One particular application of the system 2 and method is the optimization of radio-TLC conditions for the production of radiochemicals or radiopharmaceuticals. Because a number of different spotting locations 10 can be loaded with radiochemicals or radiopharmaceuticals generated under different conditions, one can quickly optimize process variables to optimize one or more parameters. This may include, for example, increasing the radiochemical yield (RCY), fluorination efficiency, or minimization of side products.

Reaction conditions such as temperature, precursor concentration, reactant concentrations can be changed with samples from multiple experiments being run on a single TLC plate 12. This enables one to quickly optimize reaction conditions or other process variables specific to the synthesis operation of interest. One can also optimize the TLC separation process for increased separation resolution. A set of known samples can be spotted on multiple TLC plates 12, and multiple experiments can be done to look at how conditions such as TLC mobile phase, type of TLC plate 12, or sample solvent affect the chromatographic resolution and the Rr values for each species.

EXPERIMENTAL

Preparation and Developing of Radio-TLC Plates

Samples of crude radiopharmaceuticals were deposited with a micropipettor 15 mm from the edge of the TLC plate 12. Deposited volume was 1.0 μL unless otherwise specified. Typically, four (4) samples were spotted on each 50 mm×60 mm TLC plate 12 along the 50 mm edge at 1 cm spacing so that four (4) lanes 16 would be formed during development. Spotting was also performed of eight (8) samples at 0.5 cm spacing on 50 mm×35 mm TLC plates 12. For mock TLC plates 12, these were spotted with [$^{18}$F]fluoride/[$^{18}$O]H$_2$O at multiple points on the TLC plate 12 and then immediately dried the plate (i.e., no developing was performed).

[$^{18}$F]Fallypride samples (synthesized according to FIG. 10) were deposited onto silica gel 60 F$_{254}$ sheets (aluminum backing) and developed with 60% MeCN in 25 mM NH$_4$HCO$_2$ with 1% TEA (v/v). The solvent front took ~8 min to travel 55 mm (i.e., 35 mm separation distance), or ~2.5 min to travel 30 mm (i.e., 15 mm separation distance). Samples of [$^{18}$F]FET and the fluorinated intermediate (see FIG. 10) were spotted onto silica gel 60 F$_{254}$ sheets (aluminum backing) and developed with a 80:20 (v/v) mixture of MeCN and DI water. The solvent front took ~9 min to travel 55 mm (i.e., 35 mm separation distance). In some cases, single samples were spotted onto longer TLC plates 12 (Baker-flex silica gel IB-F sheets, 25 mm×75 mm, plastic backing) to allow increased separation distance. In these cases, the solvent front took ~20 min to travel 70 mm (i.e., 55 mm separation distance).

Samples of [$^{177}$Lu]Lu-PSMA-617 were spotted onto RP-18 silica gel 60 F$_{254}$ sheets (aluminum backing) and developed with a 75:25 (v:v) mixture of MeOH and DI water with 0.1% TFA. After developing, the TLC plates 12 were dried at room temperature. To estimate radioactivity of deposited samples, measurements of radioactivity to estimate radioactivity concentration of samples were performed with a calibrated dose calibrator (CRC-25PET, Capintec, Florham Park, NJ, USA).

Analysis of TLC Plates by Cerenkov Luminescence Imaging

After drying, the TLC plates 12 were imaged for 5 min using the Cerenkov luminescence imaging device 20. Briefly, the radio-TLC plate 12 was placed in a light-tight chamber 22, covered with a transparent substrate 34, and Cerenkov light was detected by a scientific cooled camera 24 (QSI 540, Quantum Scientific Imaging, Poplarville, MS) equipped with a 50 mm lens (Nikkor, Nikon, Tokyo, Japan). The temperature of the image sensor 30 of the camera 24 was maintained at −10° C. for dark current reduction. The field of view was 50×50 mm$^2$.

The raw image 50 comprised an array of values (analog-to-digital units; ADUs) corresponding to detected light at each pixel location. Using custom-written MATLAB software, images 50 were processed using the operations of FIG. 4, including CCD dark current and bias level correction, lens vignetting and CCD pixel nonuniformity correction, and 3×3 median filtering. In addition, background subtraction was performed by selecting an area of the image not containing radioactive sample, computing the average pixel value, and subtracting this average from the pixel values across the whole image. Regions of interest (ROIs) were drawn on this final corrected image to enclose the radioactive regions/spots. Each ROI was integrated, and then the fraction of the integrated signal in that ROI (divided by the sum of integrated signal in all ROIs) was computed.

Analysis of TLC Plates Via Radio-TLC Scanner

TLC plates 12 were scanned with a miniGITA TLC scanner (Elysia-Raytest; Straubenhardt, Germany) for 3 min, and the resulting chromatograms were analyzed by GINA-STAR software (Elysia-Raytest). Specifically, the software allowed identification of peaks and integrating the area under the curve (AUC) for each peak. The fraction of total AUC contained within each peak was then computed. Prior to radio-TLC scanner analysis, TLC plates 12 containing multiple samples of radiopharmaceuticals were first cut into individual "lanes", each lane corresponding to a single separated sample.

High-Throughput Radio-TLC Analysis

Figure 13:
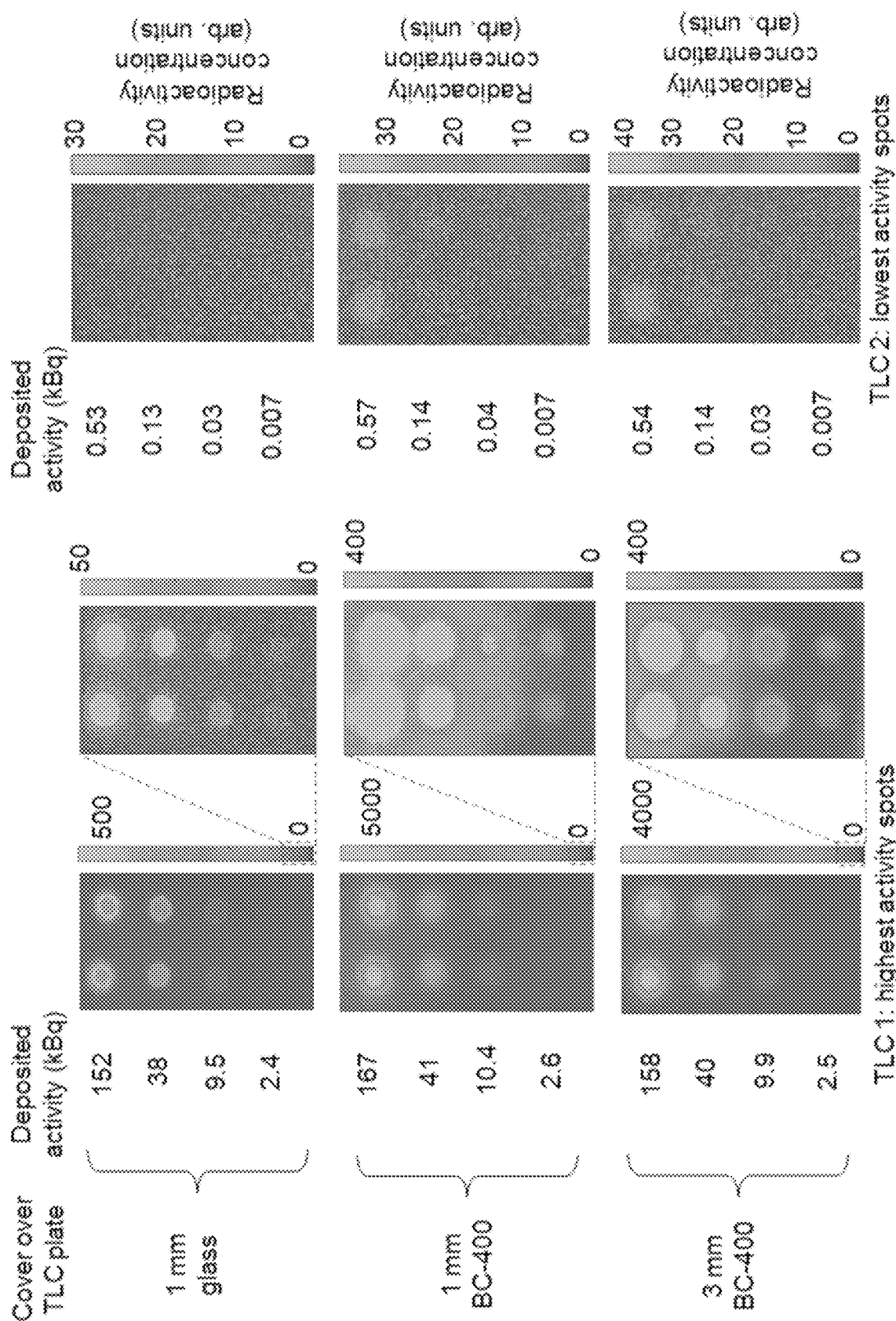
FIG. 13 illustrates how improvement of detection limit may be accomplished by varying the cover over the TLC plate (glass or BC-400 scintillator). For each case, two TLC plates were prepared, each spotted with n=2 replicates of four (4) different concentrations of [$^{18}$F]fluoride solution (1 μL each). The left side of the image represents the higher activity samples (shown with two different ranges of the color scale), and the right side of the image represents the lower activity samples.

The Cerenkov luminescence imaging device 20 used a camera 24 with a field of view was 50 mm×50 mm. When using 5 min acquisitions, the corresponding limit of detection (LOD) and limit of quantification (LOQ) were determined to be 0.8 kBq/μL and 2.4 kBq/μL, respectively, for 1 μL spots of fluoride-18 (FIGS. 11A, 11B and 12A, 12B), and the linear range extended up to 21.3 MBq (FIGS. 14A-14D). The LOD could be further reduced by replacing the glass cover with a scintillator 34 (FIG. 13).

Figure 5A:
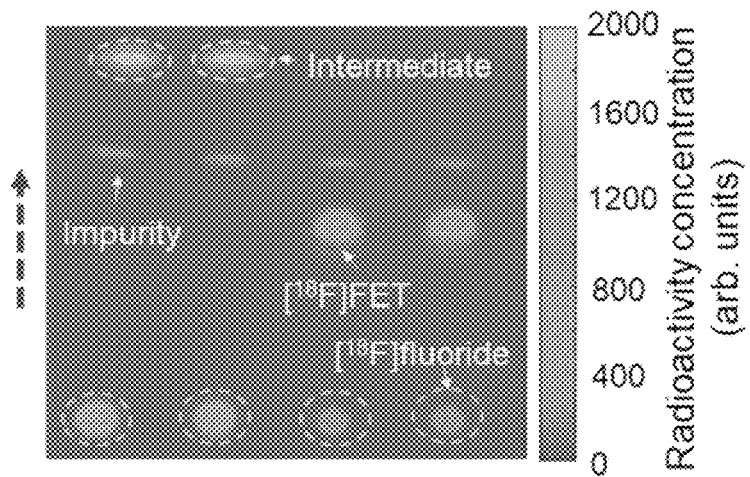
FIG. 5A illustrates an exemplary Cerenkov image of a developed TLC plate containing [$^{18}$F]FET samples. The TLC plate was spotted with two replicates of crude fluorination product (1 μL each) (left two spots) and two replicates of crude hydrolysis product (1 μL each) (right two spots). The dashed circles indicate the ROIs used for analysis. The dashed arrow indicates the direction of solvent movement during developing.
Figure 5B:
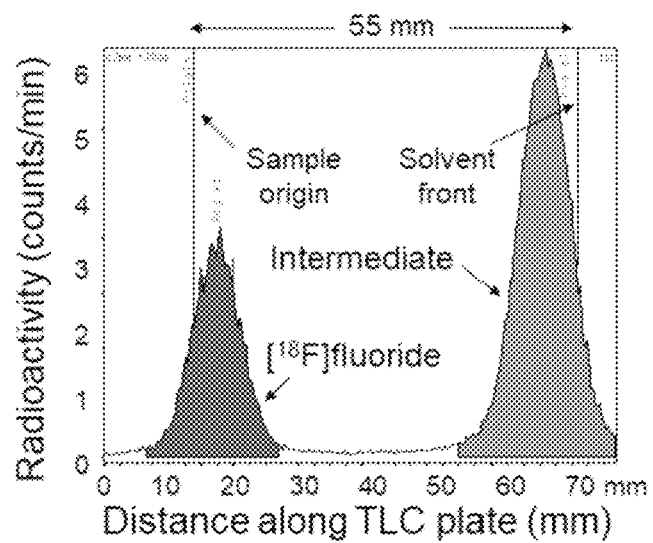
FIG. 5B illustrates an example chromatogram obtained with the radio-TLC scanner spotted with crude fluorination product.
Figure 5C:
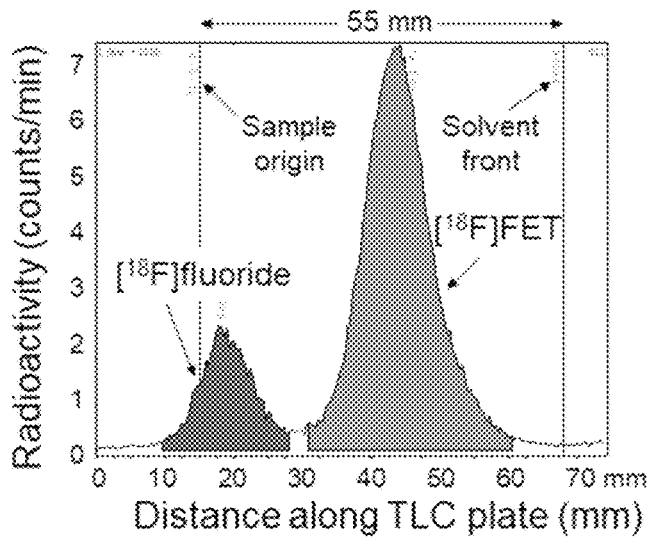
FIG. 5C illustrates an example chromatogram from a radio-TLC scan of crude hydrolysis product. Note that for FIGS. 5B and 5C, the samples were spotted onto a different TLC plate and separation performed over 55 mm instead of 35 mm (in the Cerenkov image) to try to enhance separation between the species, but the low-abundance impurity could not be discerned.

As an initial demonstration of high-throughput analysis, replicates of both [$^{18}$F]fallypride and [$^{18}$F]FET samples 14 were studied. Two replicates of a sample of the crude intermediate product (collected after fluorination of the FET precursor) were spotted on the left half of the plate and two replicates of a sample of the crude [$^{18}$F]FET product (collected after the subsequent hydrolysis step) were spotted on the right side. The CL image 108 of the developed TLC plate 12 (35 mm separation distance; silica gel 60 F$_{254}$) is shown in FIG. 5A. At the same time, each sample 14 was also spotted on an additional, longer TLC plate 12 (55 mm separation distance; silica gel IB-F), developed, and scanned with the radio-TLC scanner (sample chromatograms in FIGS. 5B and 5C). The greater separation resolution of CLI was readily apparent: a low-abundance side product (6±0% of activity, n=2) was easily visible in the CL images 108 (showing three (3) distinct regions for both samples), but was not clearly discernable or quantifiable using the radio-TLC scanner software (showing only two (2) peaks for each sample). For the pair of samples of the fluorinated intermediate, percentages of [$^{18}$F]fluoride, impurity and intermediate determined from the CL image 108 were 27±0% (n=2), 4±0% (n=2) and 68±0% (n=2), respectively. Using the miniGITA scanner after cutting the TLC plate 12 into individual "lanes", the percentages of [$^{18}$F]fluoride and intermediate for one "lane" were 32% and 68%, respectively. For the pair of samples of the crude [$^{18}$F]FET product, percentages of [$^{18}$F]fluoride, [$^{18}$F]FET and impurity from the CL image were 15±0% (n=2), 79±0% (n=2) and 6±0% (n=2), respectively. In the analysis from the miniGITA scanner, the percentages of [$^{18}$F]fluoride and [$^{18}$F]FET were 19% and 81%, respectively. Aside from the cleaner separation and better resolution, the CLI-based method also had the benefit of faster analysis. The total imaging time for the whole plate (5 min) is independent of the number of samples 14, while additional scanning time is needed for each strip cut from the radio-TLC plate (4×3 min=12 min).

Increasing Sample Throughput

To further increase the number of samples 14 that can be analyzed simultaneously, one option would be to redesign the optical system (including a lens) to achieve a larger field of view. Then, a TLC plate 12 (wider than 50 mm) with more spots 10 (i.e., lanes 16) could be developed and imaged without increasing the overall analysis time (i.e., without increasing the developing time or readout time). Such an approach would result in a reduction in the number of pixels per imaged spot, however, potentially increasing the noise level slightly and decreasing sensitivity.

Figure 6A:
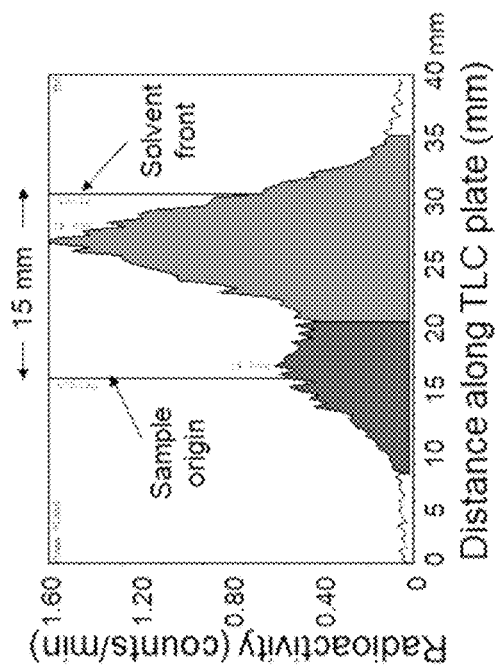
FIG. 6A illustrates an exemplary image of Cerenkov image of a developed TLC plate containing crude [$^{18}$F]fallypride samples. The TLC plate was spotted with 4 replicates (two 1.0 μL and two 0.5 μL) of the same crude reaction mixture using only 15 mm separation distance.
Figure 6B:
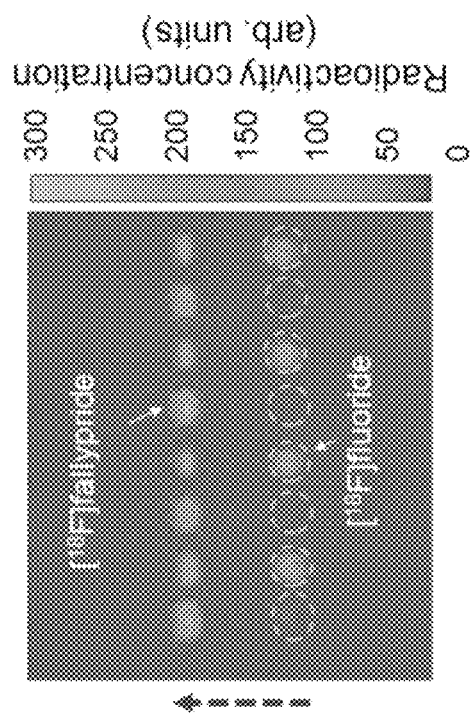
FIG. 6B illustrates one example chromatogram obtained from the 0.5 μL sample in FIG. 6A using the radio-TLC scanner. The TLC plate was first imaged with the CLI based scanner and then was cut into four (4) "lanes" each of which was scanned separately with a Raytest miniGITA scanner.
Figure 6C:
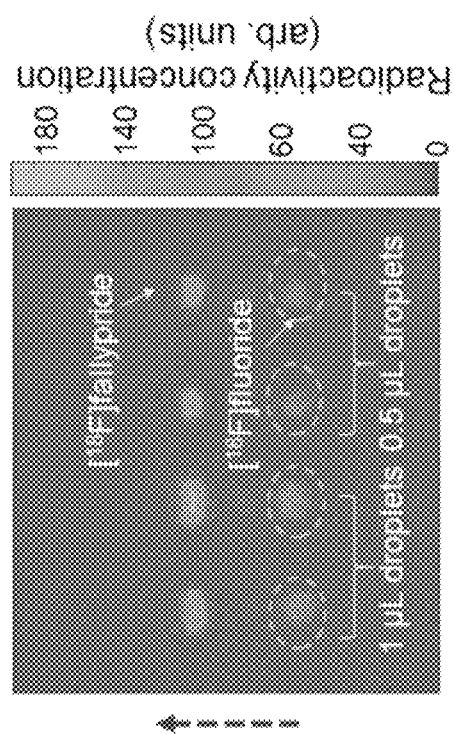
FIG. 6C illustrates a Cerenkov image of a developed TLC plate spotted with eight (8) replicates (0.5 μL) of another batch of crude [$^{18}$F]fallypride. The dashed circles represent the ROIs for analysis. The dashed arrow represents the direction of solvent flow during developing.
Figure 6D:
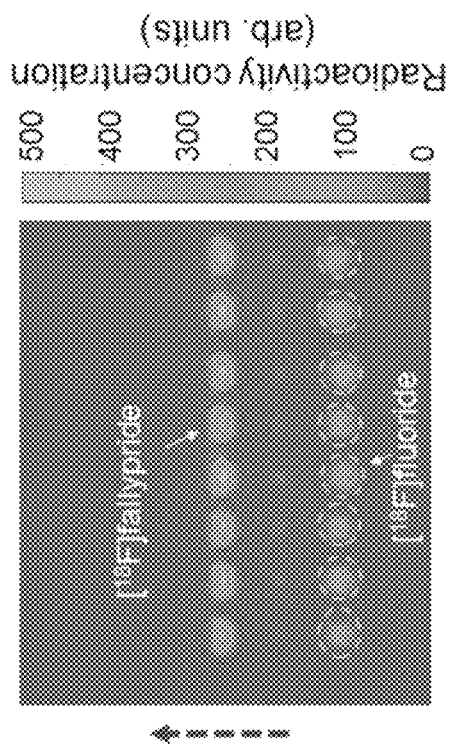
FIG. 6D illustrates a Cerenkov image of a developed TLC plate spotted with eight (8) droplets (0.5 μL) sampled from eight (8) different batches of crude [$^{18}$F]fallypride reacted under different sets of conditions (n=4 replicates each of two different sets of conditions, spotted in alternating pattern). The dashed circles highlight the ROIs for the eight (8) samples. The dashed arrow represents the direction of solvent flow during developing.

Alternatively, the size of the radio-TLC plates 12 could be further reduced to allow multiple TLC plates 12 to fit within the field of view. Due to the excellent separation in the Cerenkov images, it was hypothesized that the separation length could be even further reduced. FIG. 6A shows the separation of four (4) crude samples of [$^{18}$F]Fallypride, with a separation distance of only 15 mm. The radio-TLC plate (silica gel 60 $F_{254}$) cut to 50 mm×35 mm size was spotted with two 1 µL droplets and two 0.5 µL droplets at 1 cm spacing along the long edge of the plate, 15 mm from this edge. After developing, the resulting CLI images 108 showed clear separation of the spots, allowing accurate quantification. The fluorination efficiency obtained with the CLI-based analysis for 1 µL spot size was 76±0% (n=2), and for 0.5 µL spot size was 74±1% (n=2). To compare with the radio-TLC scanner, each TLC plate was cut into four lanes. The resulting chromatograms showed 78% conversion for 1 µL spot size and 74% for 0.5 µL spot size, but, notably, the peaks exhibited very significant overlap (FIG. 6B) which can introduce significant errors and uncertainties into the analysis. To further increase the throughput, eight (8) samples from a batch of crude [$^{18}$F]Fallypride were spotted (0.5 µL droplet size) on the TLC plate 12 at 5 mm spacing and separated for 15 mm as well (FIG. 6C). The fluorination efficiency obtained with the CLI-based analysis appears to be consistent (73±1%, n=8). In another experiment, 2 different batches (n=4 replicates each batch) of crude [$^{18}$F] fallypride were analyzed, enabling fluorination efficiency to be easily determined for each (FIG. 6D). In addition to being able to fit a larger number of samples in the CLI system field of view, the plate 12 could be developed more quickly (i.e., 2.5 min for the 15 mm separation distance vs. 8 min for 35 mm separation). Readout throughput could be further increased by placing two or more of these TLC plates 12 within the field of view of the Cerenkov luminescence imaging device 20.

Comparison of Readout Via CLI Versus a Radio-TLC Scanner

Figure 7:
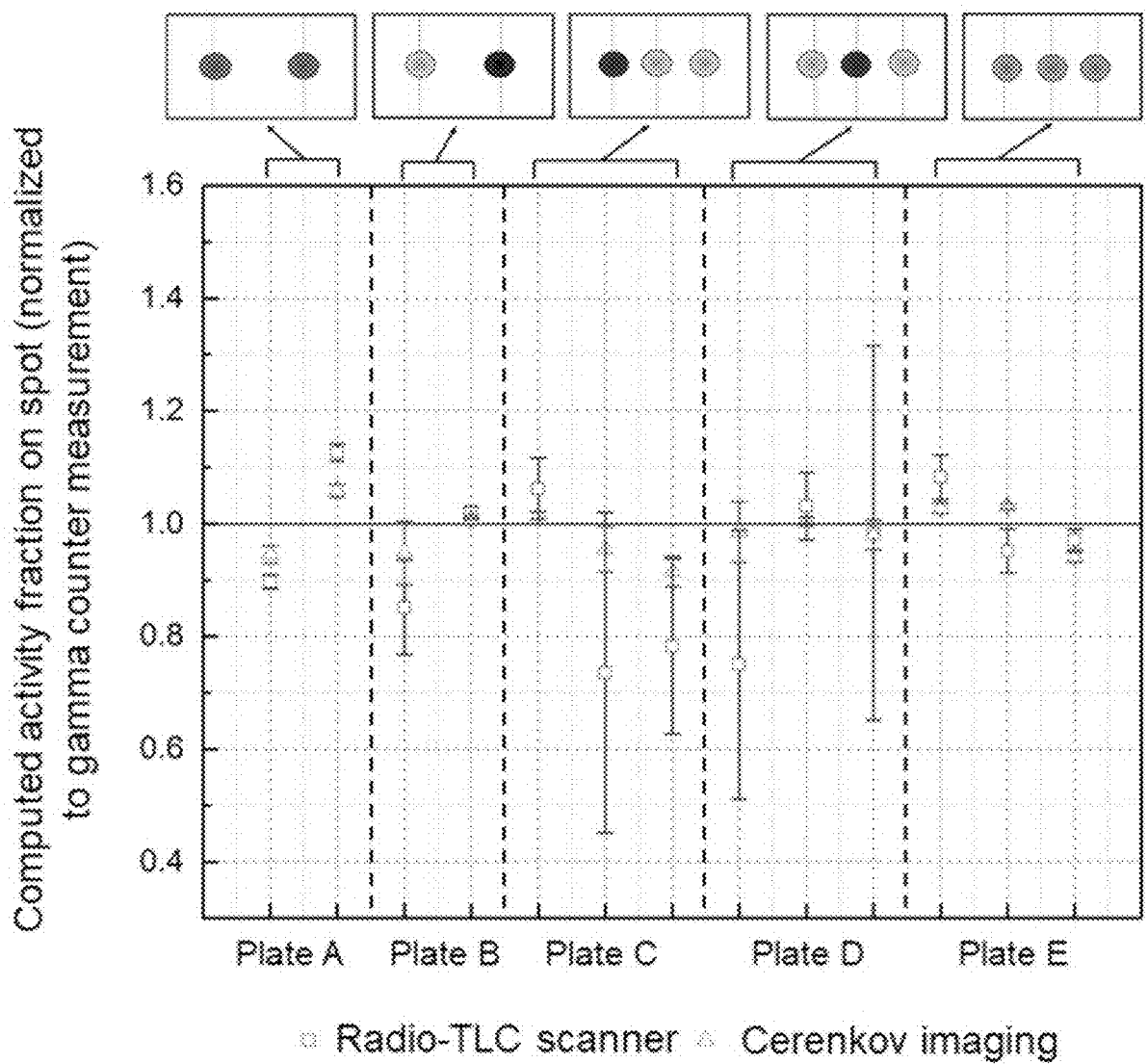
FIG. 7 illustrates the radio-TLC readout performance comparison of radio-TLC scanner (squares) and Cerenkov luminescence (triangles) of the plates in FIG. 17. The data points show the average activity fraction in each spot (averaged over the analysis performed by n=8 participants) normalized by the activity fraction determined by gamma counting. The error bars show the relative standard deviations. The black dashed vertical lines separate the data from each of the five radio-TLC plates. Pictorial representations of the activity distribution are shown at the top of the graph (darker spots represent higher activity level).

In a systematic analysis, the accuracy and precision of CLI-based analysis was found to be higher than analysis using commercial radio-TLC scanner software (miniGITA), especially for closely spaced peaks and unequal activity distribution. The results of gamma counting (taken as ground truth; calibration curve in FIG. 16) and analysis via CLI and radio-TLC scanner are summarized in Table 1 and FIG. 7.

Assessing Quality of the TLC Spotting and Development Process

One notable advantage of the Cerenkov imaging readout technique versus radio-TLC scanner readout is the ability to see a high-resolution 2D image 108 of the final separation. This can be used to monitor the quality of the spotting and developing process. For example, compared to a normal separation (FIG. 8A), problems such as the splitting of single spots into multiple regions due to incomplete drying of the sample can be observed before developing (FIG. 8B), poor separation as a result of large spot size (FIG. 8C), and non-linear separation path due to accidentally introducing an additional source (droplet) of liquid at the side of the radio-TLC plate 12 during developing (FIG. 8D). It should also be possible to detect problems such as double-spotting, or inadvertent contamination of the plate during spotting or subsequent handling. This feedback provides increased information to ensure accurate readout of a given radio-TLC plate 12 or to determine when a TLC plate 12 (sample spotting and separation) should be re-run.

Figure 18:
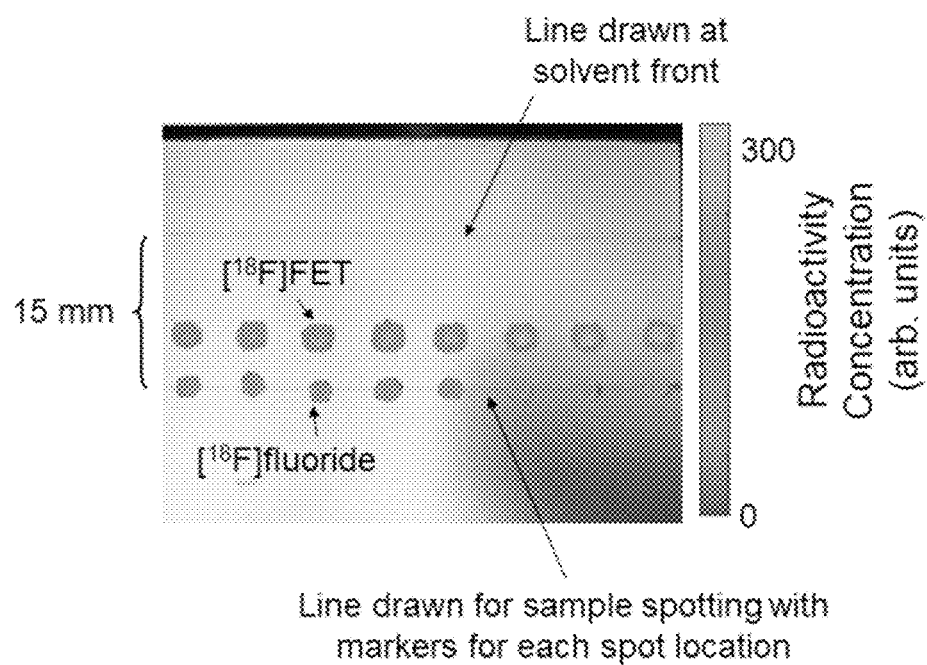
FIG. 18 illustrates an example image obtained by superimposing the Cerenkov luminescence signal (false color) over a brightfield image (greyscale). Eight replicate samples (0.5 μL each) of crude [$^{18}$F]FET were spotted on a single TLC plate with 5 mm pitch and then separated in parallel. The separation distance was 15 mm.

The CLI readout can be improved by using the same camera 24 to take a brightfield image of the radio-TLC plate 12 (including markings on the TLC plate 12 of sample origin and solvent front) and superimposing the CL image on the brightfield image. An example showing both the sample origin and solvent front from the brightfield image (e.g., to compute Rr values) superimposed with the CL image 108 is seen in FIG. 18.

Radiochemical Purity Measurement of [$^{177}$Lu]-PSMA-617 Via CLI

Figure 9B:
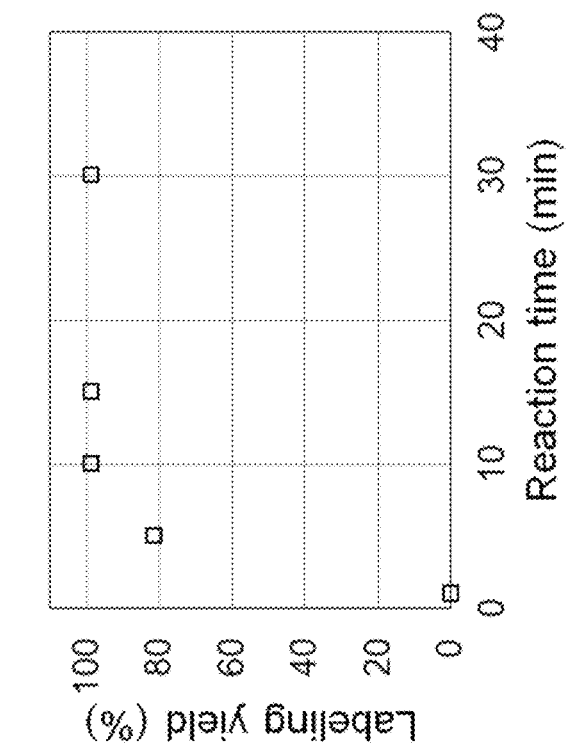
FIG. 9B illustrates a graph of radiolabeling yields of [$^{177}$Lu]Lu-PSMA-617 as a function of reaction time.
Figure 9A:
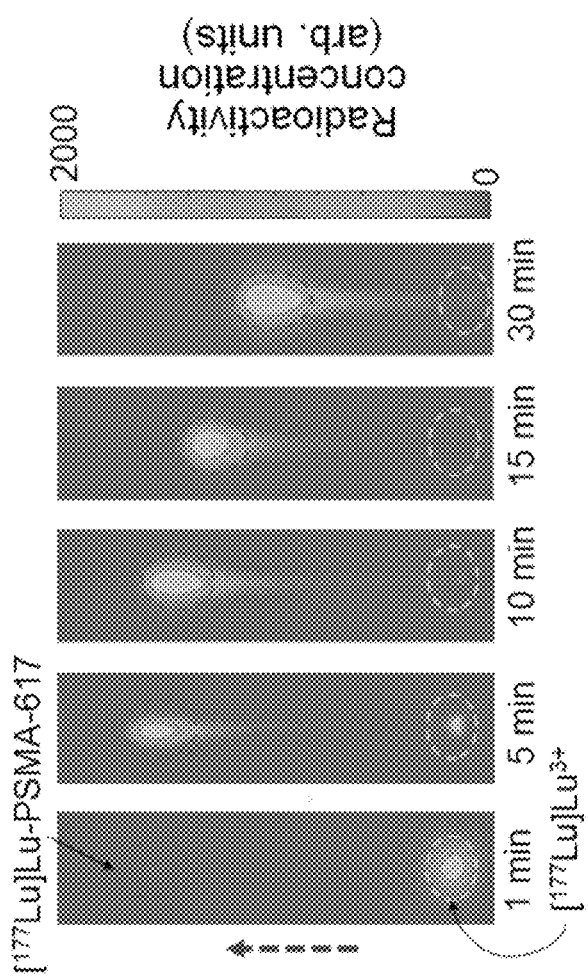
FIG. 9A illustrates a Cerenkov image of developed TLC plates spotted with droplets (2 μL) of the crude reaction mixture (of crude [$^{177}$Lu]Lu-PSMA-617 samples (β$^-$-emitter)) sampled at different reaction times. In this demonstration, each TLC plate was developed individually, resulting in variable separation distances, but multiple plates were imaged together. The dashed circles represent the ROIs for analysis. The dashed arrow represents the direction of solvent flow during developing.

To explore the application of CLI-based radio-TLC analysis to additional isotopes, labeling yield of [$^{177}$Lu]Lu-PSMA-617 was measured as a function of reaction time by sampling 2 µL crude product (925 kBq/µL) at different time points and spotting on a TLC plate 12 (silica gel 60 RP-18 $F_{254}$, aluminum backing). The results of CLI analysis in FIG. 9B suggest that high labeling efficiency (99%) can be achieved in just 10 min, rather than the typical 30 min timeframe used.

Cerenkov imaging in combination with parallel developing of multiple samples 14 on a single TLC plate 12 proved to be a practical method for rapid, high-throughput radio-TLC analysis. Compared with the miniGITA radio-TLC scanner, the CLI-based imaging method provided significantly higher resolution, the ability to image multiple samples in parallel (rather than requiring sequential scanning), and the ability to detect and quantify low-abundance impurities that were not discernable with radio-TLC scanning. The bulk of time and effort savings were realized by spotting multiple samples 14 onto a single TLC plate 12 and developing the multiple samples 14 in parallel prior to imaging, rather than spotting the developing separate TLC plates 12 individually. Furthermore, by leveraging the high resolution of CLI, a much smaller separation distance could be used while still resolving each region of radioactivity, further reducing the time needed for developing the samples. The shorter separation distance in turn can facilitate increased throughput by enabling more TLC plates 12 to be imaged within the field of view; alternatively, the optical system could be redesigned to increase the field of view, thus allowing more spots to be imaged without increasing the system cost or imaging time.

Quantitative accuracy of the CLI-based readout was found to be higher compared to analysis via the radio-TLC scanner software, and relative uncertainty was lower. This was especially true when chromatograms contained overlapping peaks and/or small peaks. Furthermore, CLI-based analysis enabled detection of quality issues in the spotting or development processes.

CLI imaging of TLC plates 12 has broad application for the analysis of radiotracers labeled with radionuclides that are positron emitters (F-18, Cu-64, Zr-89, I-124) used for PET imaging and radiopharmaceuticals labeled with beta emitters (e.g., I-131, Lu-177). Though the experiments used the analysis of $^{18}$F-labeled compounds and $^{177}$Lu-labeled peptide, this approach could also be used for the analysis of radiopharmaceuticals labeled with alpha emitters (e.g., Ac-225, Bi-213), with applications in targeted radiotherapeutics. Previous reports have shown detectable Cerenkov emission from such radionuclides, likely due to emissions from daughter isotopes. In addition to high-throughput analysis applications, the rapid separation and readout of radio-TLC plates 12 by the method described here could be especially useful in conjunction with very short-lived isotopes such as C-11 (half-life 20.4 min).

Reagents and Materials

Methanol (MeOH), 2,3-dimethyl-2-butanol (thexyl alcohol; 98%), trifluoroacetic acid (TFA, 99%), ethanol (EtOH, 99.5%), anhydrous acetonitrile (MeCN, 99.8%), and 1 N hydrochloric acid (HCl) were purchased from Sigma-Aldrich. Sodium acetate was purchased from Alfa Aesar. Tetrabutylammounium bicarbonate (TBAHCO$_3$, 75 mM), (S)-2,3-dimethoxy-5-[3-[[(4-methylphenyl)-sulfonyl]oxy]-propyl]-N-[[1-(2-propenyl)-2-pyrrolidinyl]methyl]-benzamide (Fallypride precursor), O-(2-[$^{18}$F]Fluoroethyl)-L-tyrosine (FET precursor) and PSMA-617 were purchased from ABX Advanced Biochemical Compounds (Radeberg, Germany). Unmodified and RP-18 modified silica gel 60 F$_{254}$ sheets (aluminum backing; 50 mm×200 mm) were purchased from Merck KGaA (Darmstadt, Germany) and were cut into 50 mm×60 mm pieces for use. Baker-flex silica gel IB-F sheets (plastic backing; 25 mm×75 mm) were obtained from Fisher Scientific (Hampton, NH, USA). Sheets of organic scintillator BC-400 (1 mm and 3 mm thicknesses) were purchased from Saint-Gobain (Kamataka, India). Glass microscope slides (76.2 mm×50.8 mm, 1 mm thick) were obtained from C&A Scientific (Manassas, VA, USA). DI water was obtained from a Milli-Q water purification system (EMD Millipore Corporation, Berlin, Germany). No-carrier-added [$^{18}$F]fluoride in [$^{18}$O]H$_2$O was obtained from the UCLA Ahmanson Biomedical Cyclotron. No-carrier-added [$^{177}$Lu]LuCl$_3$ was obtained from Isotope Technologies Munich and Spectron MRC LLC.

Samples of [$^{18}$F]fallypride

Figure 10:
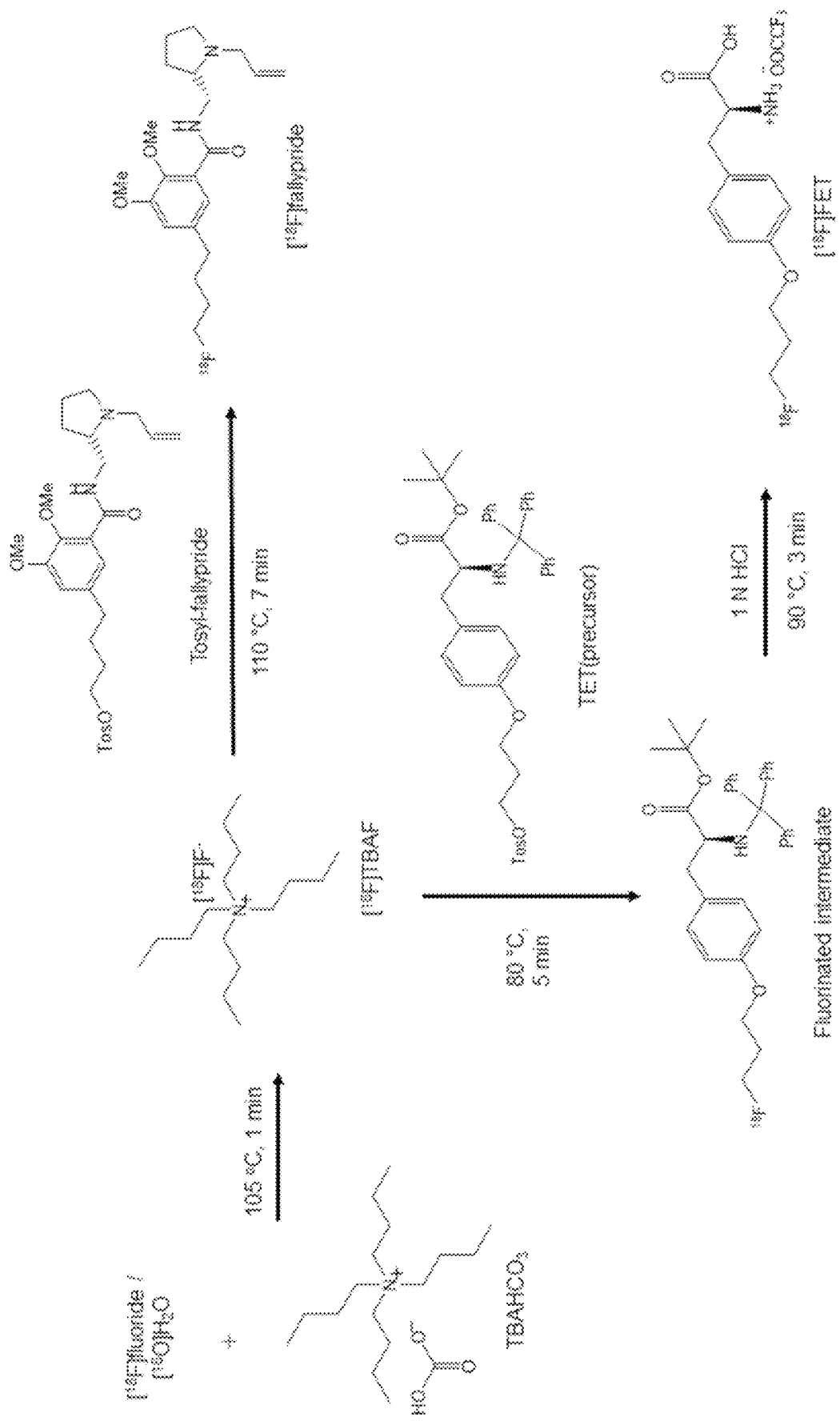
FIG. 10 illustrates the radiosynthesis of [$^{18}$F]fallypride and [$^{18}$F]FET. For both compounds, [$^{18}$F]fluoride in [$^{18}$O]H$_2$O is first dried and activated. To synthesize [$^{18}$F]fallypride, the dried residue is reacted with tosyl-fallypride, and to synthesize [$^{18}$F]FET, the dried residue is first reacted with O-(2-[$^{18}$F]Fluoroethyl)-L-tyrosine (precursor TET) and then the resulting intermediate undergoes a deprotection reaction.

Crude [$^{18}$F]fallypride was obtained from a microdroplet synthesis (FIG. 10). Briefly, from a 50 µL [$^{18}$F]fluoride stock solution (1 mCi; 3.75 mM TBAHCO$_3$), an 8 µL droplet was deposited on the chip and dried for 1 min at 105° C. Next, a 4 µL solution of fallypride precursor (77 mM in 1:1 v/v mixture of thexyl alcohol and MeCN) was added, mixed with the dried residue, and allowed to react for 7 min at 110° C. Crude [$^{18}$F]fallypride product was collected from the chip with 60 µL of 90% MeOH and 10% DI water.

Samples of [$^{18}$F]FET

The microdroplet synthesis of [$^{18}$F]FET (FIG. 10) was adapted from the method of Hamacher et al., Efficient Routine Production of the 18F-Labelled Amino Acid O-(2-[18F]Fluoroethyl)-1-Tyrosine. Appl. Radiat. Isot. 2002, 57 (6), 853-856 and Bourdier et al., A Fully Automated One-Pot Radiosynthesis of O-(2-[18F]Fluoroethyl)-1-Tyrosine on the TracerLab FXFN Module. Nucl. Med. Biol. 2011, 38 (5), 645-651. A 1.5 µL droplet of 9.8 mM TBAHCO$_3$ solution and 10 µL of [$^{18}$F]fluoride/[$^{18}$O]H$_2$O (1-7 mCi) were loaded on a chip and dried for 1 min at 105° C. Next, 10 µL of FET precursor (5 mM in 1:1 v/v mixture of thexyl alcohol and MeCN) was added and reacted with the dried [$^{18}$F]TBAF residue for 5 min at 80° C. Finally, 10 µL of 1 N HCl was added to hydrolyze the intermediate at 90° C. for 3 min, and the crude product was collected using 40 µL of a 1:1 (v/v) mixture of EtOH and DI water. When needed, samples of the fluorinated intermediated were collected using 90:10 (v/v) mixture of MeOH and DI water.

Samples of [$^{177}$Lu]Lu-PSMA-617

PSMA-617 was added to a solution of [$^{177}$Lu]LuCl$_3$ (84 MBq/nmol precursor) in 0.4M sodium acetate buffer, pH 4.8, containing dihydroxybenzoic acid (10 mg/mL). The mixture was heated to 95° C. in a dry heating block. Multiple samples for Cerenkov analysis were obtained by opening the reaction vial and sampling the reaction mixture at different timepoints.

Detection Range

Methods

To determine the limit of detection (LOD) of the CLI setup for 5 min acquisitions, samples containing different amounts of radioactivity were spotted and analyzed. TLC plates 12 containing a fluorescent dopant were used to maximize the Cerenkov brightness and thus the sensitivity. Radioactivity of the original mixture of [$^{18}$F]fluoride/[$^{18}$O] H$_2$O and DI water, measured with a dose calibrator, was 88.8 kBq/µL. A series of 1:1 (v/v) dilutions was created and spotted across two TLC plates 12. Each plate 12 had five of the dilutions, each spotted with n=4 replicates at 1 cm intervals for a total of 20 spots per TLC plate. 1 µL was deposited for each spot. The plates 12 were dried and a glass slide 34 was placed over top during imaging. For each spot 10 on the same TLC plate 12, the deposited activity was estimated and decay-corrected to the start-time of plate imaging. For each TLC plate 12, decay-correction was performed to the start-time of imaging of that TLC plate 12.

A circular ROI (consisting of 4250 pixels) was drawn around each deposited droplet and the total integrated signal calculated for each from the corrected image. To determine the background noise level, 8 ROIs of the same size were drawn in the blank region of the image and the integrated signal (i.e., total ADUs) computed for each. Since background subtraction has been performed, the integrated signal for each ROI was expected to be close to zero. The noise level was determined by calculating the standard deviation of the integrated signal for the 8 ROIs. The LOD was then taken as the point where a plot of the integrated ADU as a function of activity crossed 3× the noise level.

The maximum detectable activity was determined by a similar procedure using a dilution series of higher activity spots (radioactivity of the original mixture was 20.7 MBq/ µL). After processing Cerenkov images, the integrated signal versus radioactivity was fit to a straight line and the maximum detectable activity was defined where the data points deviated from the line. It was expected that this would occur when spots contain a significant number of saturated pixels.

Results

Figure 11A:
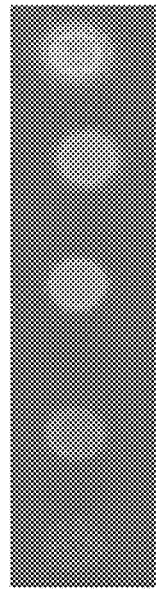
FIGS. 11A-11C illustrate the evaluation of limit of detection (LOD) of the Cerenkov luminescence approach.
Figure 11B:
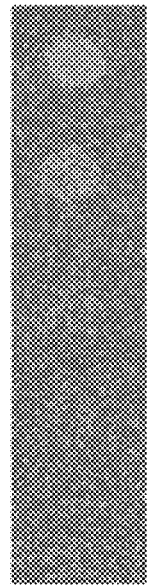
Figure 11C:
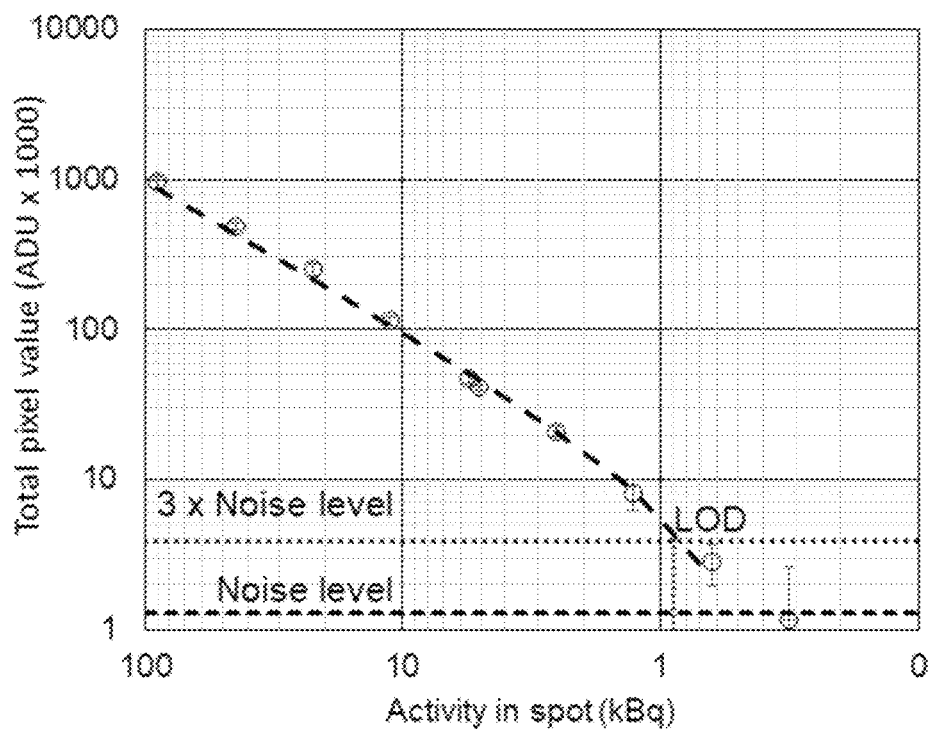
Figure 12A:
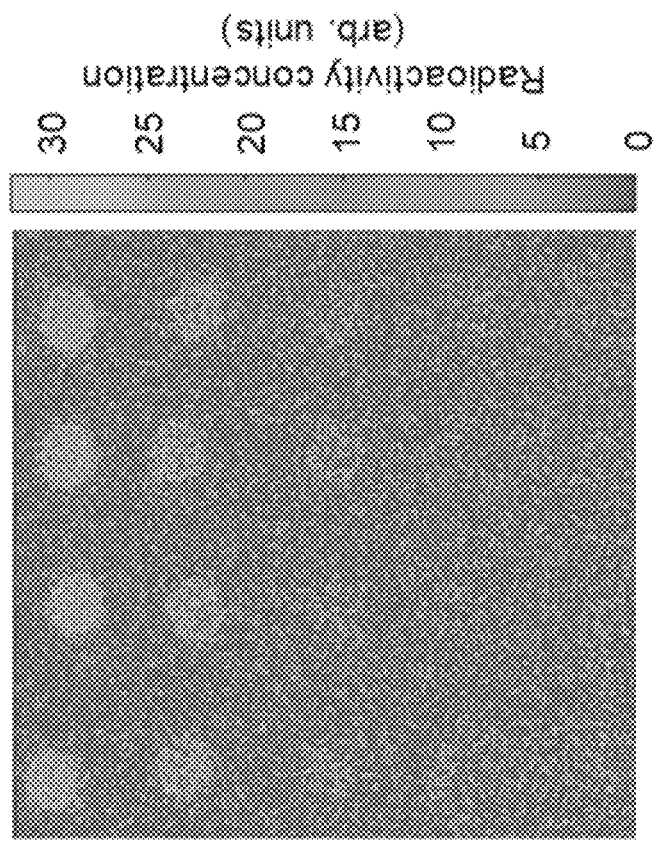
FIGS. 12A and 12B illustrates the full set of Cerenkov images used for determination of limit of detection (LOD).
Figure 12B:
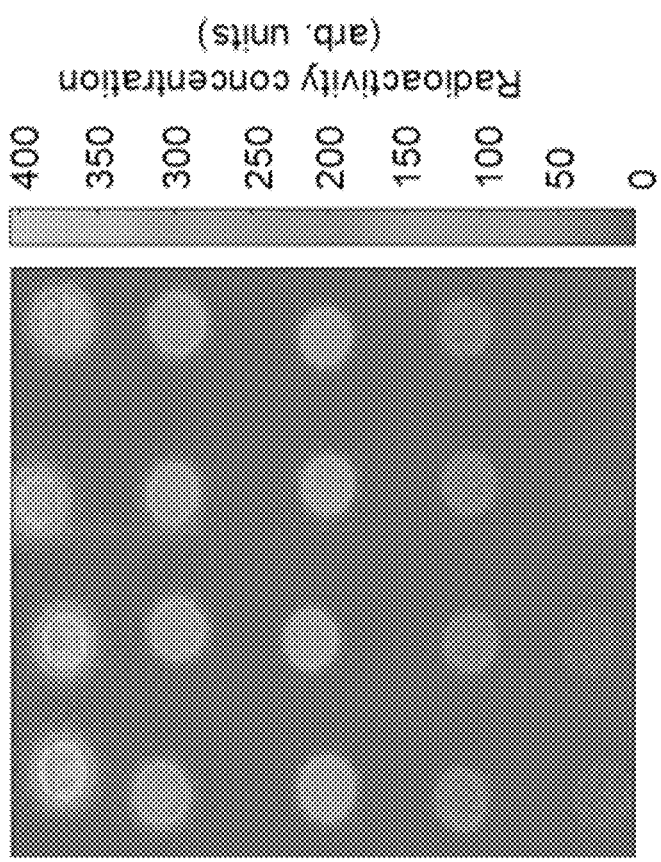

Sample images from the dilution series are shown in FIGS. 11A-11B. (The full set of data is shown in the FIGS. 12A-12B). From the background ROIs (−1300±1300, n=8), it was determined that the noise level is 1300 ADU. After linear fitting of the integrated ADU as a function of activity (FIG. 11C), the corresponding LOD was determined to be 0.8 kBq (intersection with 3× noise level). The limit of quantification (LOQ) was 2.4 kBq. To reliably quantify the proportion of activity in different spots resulting from a real TLC separation process, the initially deposited sample activity must be sufficient that the amount of activity in each spot after the separation process is above the LOQ. In general, the greater the activity in the initial sample, the more accurate quantification of low-activity spots (i.e., low-abundance species) after developing. For example, spotting a 37 kBq sample would allow species with abundance as low as ~10% to be quantified. Spotting a 370 or 3700 kBq sample would allow species with abundance as low as ~1% or ~0.1% to be quantified, respectively.

It should be mentioned that increasing the sample volume is typically not a desirable way to increase the activity level. Instead one can use a different cover plate 34. For example, by replacing the cover glass 34 (1 mm thick) with an organic BC-400 scintillator (1 mm thick), light output was increased significantly, and the LOD could be improved (FIG. 13). Light output of the plate 34 with the 1 mm thick and 3 mm thick scintillators are comparable since the positrons travel less than ~1 mm in plastic. Note that the spots on TLC plates 12 covered with the scintillators appear to be blurrier than the glass cover; it is believed that this is due to a slight shift in focal plane. If needed, the sensitivity could be further boosted by imaging for a longer period of time (detection limit improves as the square root of acquisition time), or potentially by choosing a thicker TLC plate 12 or adding a liquid scintillator spray.

For higher activity levels, pixels in the image can become saturated and the integrated ROI underestimates the actual activity level. The maximum detectable activity of the CLI setup was determined to be 21300 kBq, the interception of the linear fit and theoretical limit (FIGS. 14A-14D). If higher activity samples need to be analyzed, saturation can be avoided by reducing the imaging time (i.e., signal will be reduced in proportion to the reduction in acquisition time), or reducing the lens aperture. Alternatively, the signal can be reduced by using a thinner or lower refractive index material as a cover during imaging.

Repeatability Test

Figures 15A, 15B:
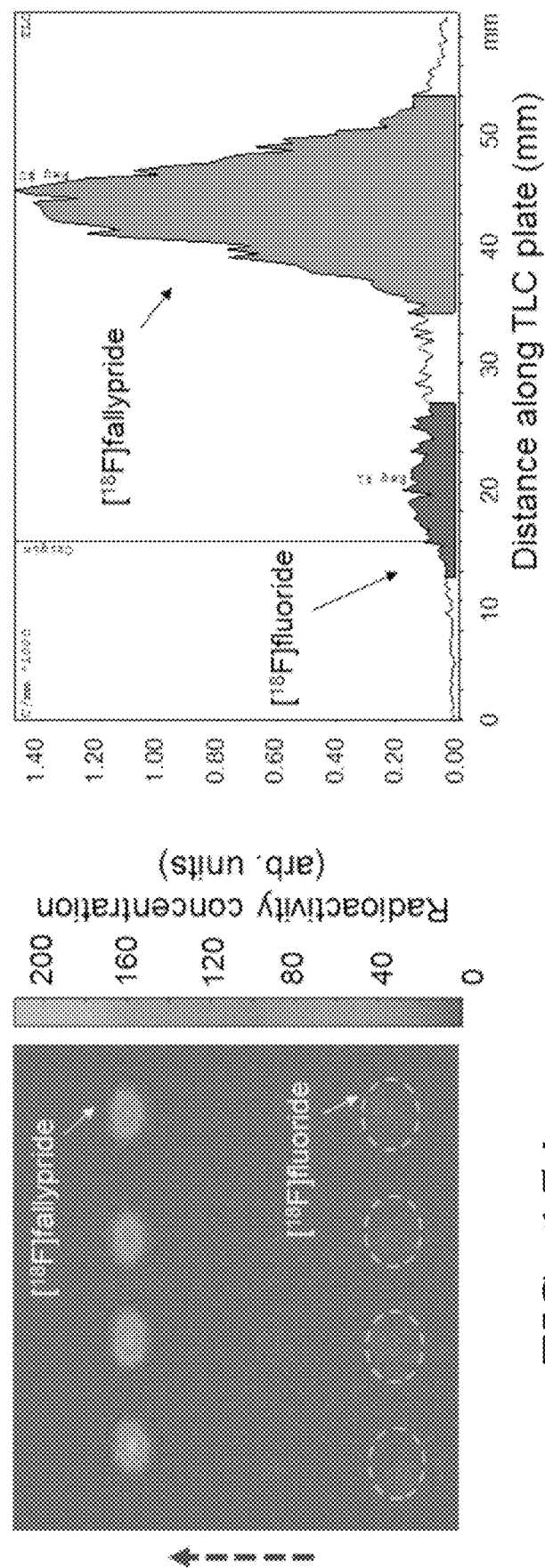
FIG. 15A illustrates Cerenkov image of developed TLC plate spotted with four (4) replicates (1 μL each) of the same crude reaction mixture ([$^{18}$F]fallypride) using a separation distance of 35 mm. The dashed circles represent the ROIs for analysis. The dashed arrow represents the direction of solvent flow during developing.
FIG. 15B illustrates one example chromatogram for plate of FIG. 15A obtained using the radio-TLC scanner. To scan the TLC plate, it was cut into four (4) strips after Cerenkov imaging was performed.

As an initial demonstration of high-throughput analysis to study replicate samples, four droplets of the same crude [$^{18}$F]fallypride product were deposited on a single TLC plate 12 (silica gel 60 $F_{254}$), developed the plate to separate all samples simultaneously (separation distance 35 mm), and then performed CLI imaging of the whole plate. FIG. 15A shows the resulting CLI image, as well as a representative chromatogram (FIG. 15B) from a conventional radio-TLC scanner (obtained after cutting the TLC plate into individual lanes, each corresponding to one separated sample). The fluorination efficiency obtained with the CLI-based analysis (88±1%, n=4) compared favorably with the analysis using the radio-TLC scanner software (90±0%, n=4).

Comparison of Radio-TLC Analysis Methods

Methods

Three methods of reading and analyzing the TLC plates 12 were compared. Solutions comprising [$^{18}$F]fluoride/[$^{18}$O]H$_2$O and DI water were prepared in different activity concentrations ranging from ~17 kBq/μL to ~148 kBq/μL. Droplets of the same or different concentrations were spotted on the TLC plate 12 to test the detection performance at different peak ratios. Five different TLC plates 12 were prepared by depositing 1 μL droplets with activities in the following ratios: (1) 50:50 (two droplets of 37 kBq/μL each), (2) 10:90 (droplets of ~17 kBq/μL and ~148 kBq/μL, respectively), (3) 80:10:10 (droplets of ~148, ~17, and ~17 kBq/μL, respectively), (4) 10:80:10 (droplets of ~17, ~148, and ~17 kBq/μL, respectively), and (5) 33:33:33 (three droplets of 37 kBq/μL each). For cases with two radioactive spots, the distance between spot centers was 35 mm, and for cases with three spots, the distance was 17.5 mm. Plates were dried after spotting but not developed.

Cerenkov images and radio-TLC scans were obtained as described above. As a reference point, and to account for possible errors in preparing stock solutions and pipetting, the activity in the spots was also measured with an automatic well-type gamma counter (WIZARD 3" 1480, Perkin Elmer, Waltham, MA, USA). The TLC plates were cut with scissors at the midpoint between expected spot locations (2 halves for plates with 2 samples and 3 thirds for plates with 3 samples). Individual pieces of TLC plates were placed in 20 mL HDPE scintillation vials from Thermo Fisher Scientific (Pittsburgh, Pennsylvania, USA) and the activity was counted for 1 min. For each original TLC plate 12, the radioactivity distribution of a single spot was expressed as a fraction of the total radioactivity (sum of radioactivity of all spots on the plate).

Figure 16:
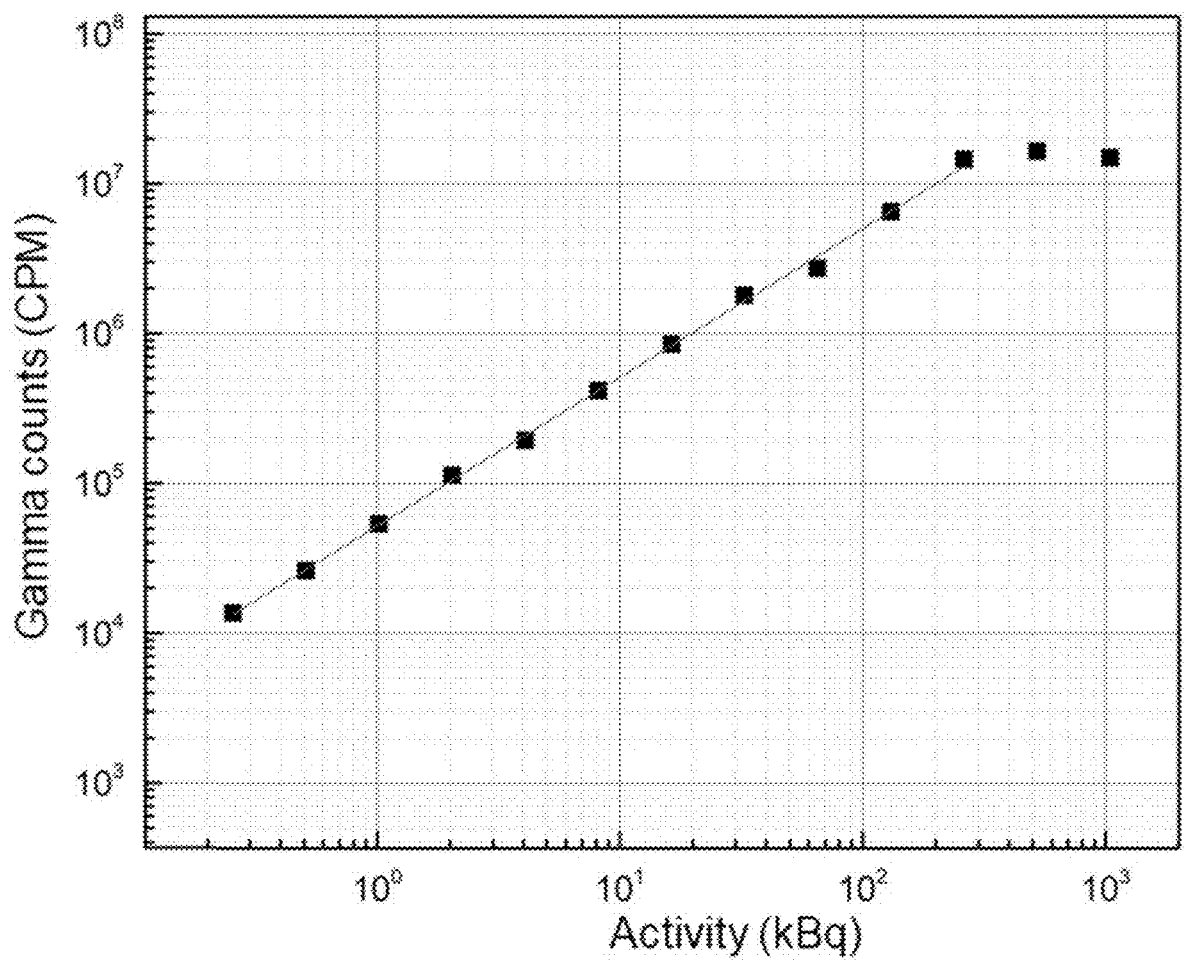
FIG. 16 illustrates a calibration of gamma counter to determine linear range. A linear least square fit of the linear part of the curve was performed ($R^2$=0.9987).

A calibration curve was separately generated to ensure all measurements were within the linear range of the gamma counter. The calibration curve was generated by preparing a dilution series of [$^{18}$F]fluoride/[$^{18}$O]H$_2$O solution in Eppendorf tubes. A stock solution was prepared with concentration 2590 kBq/mL, and then a 2× dilution series was created by preparing mixtures of 500 μL of DI water with 500 μL of the previous dilution. Samples were measured in a gamma counter for 1 min counting time and decay-corrected to the measurement time of the first sample. The relationship was found to be linear up to ~300 kBq (FIG. 16). For higher activity samples, the counter reached saturation.

To compare readout methods (CLI and miniGITA scanner), a survey was made that requested participants (experienced operators of radio-TLC scanners; n=8) to analyze the chromatograms obtained with the miniGITA scanner and the CLI images without knowing the deposited percentages on each of the 5 sample plates. The average percentage was computed for each spot/method (across all participants) and the relative error was determined by using the gamma counter as a reference. This was done by subtracting the percentage as measured by the gamma counter and dividing the result by the gamma counter percentage. The relative uncertainty for a particular spot/method was calculated as the standard deviation of percentages (across all participants) divided by the average of percentages computed above.

Results

Figure 17:
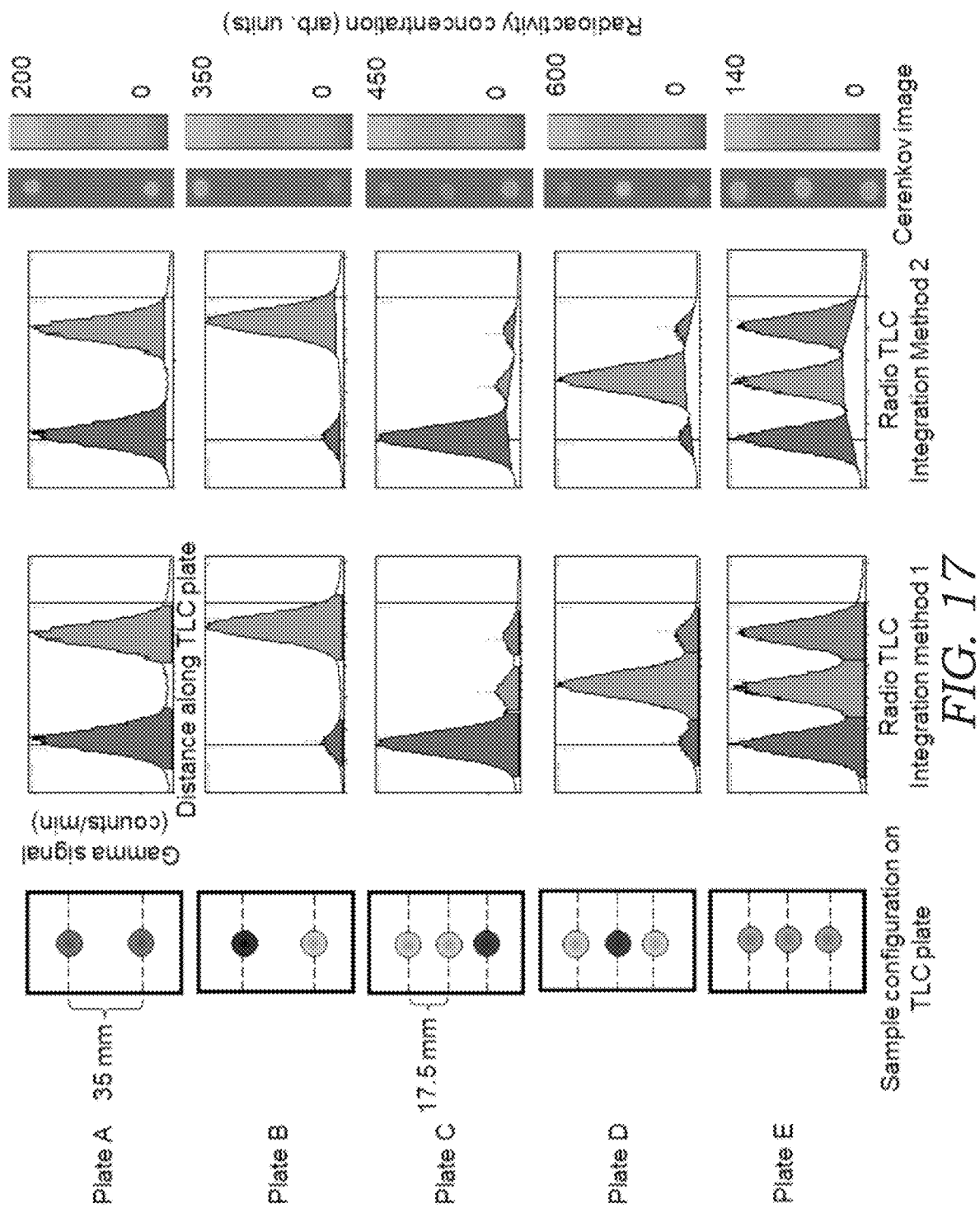
FIG. 17 illustrates a comparison of analysis via radio-TLC scanner software and Cerenkov luminescence imaging approach for five specially-prepared radio-TLC plates. The first column depicts a schematic of the arrangement of [$^{18}$F]fluoride solution samples (1 μL each but different concentrations) on the radio-TLC plate. The darkness of each spot represents the amount of radioactivity. Note that the radio-TLC scanning direction is from bottom to top. The intended radioactivity distributions (bottom to top) were: 50:50 (Plate A), 10:90 (Plate B), 80:10:10 (Plate C), 10:80:10 (Plate D), and 33:33:33 (Plate E). The second and third columns show radio-chromatograms obtained from a radio-TLC scanner. The columns depict the same radio-chromatograms, but use two different methods of integrating the peaks. Finally, the fourth column shows a Cerenkov luminescence image of the same plate.

To systematically compare the performance of CLI readout to a conventional radio-TLC scanner and to determine the influence of overlapping peaks, five mock radio-TLC plates 12 were prepared by spotting with different patterns of activity (FIG. 17), and n=8 participants (with experience in radio-TLC scanner operation and analysis of chromatograms) were asked to analyze the resulting data. The results of gamma counting (taken as ground truth; calibration curve is FIG. 16) and analysis via CLI and radio-TLC scanner are summarized in Table 1 and FIG. 7.

For all plates, the CLI images showed well-separated spots and participants could readily draw ROIs that accurately contained the activity of each spot. In contrast, the radio-TLC scanner, not equipped with a collimator, showed wide peaks that overlapped in many of the plates. In all cases, the CLI-based results were in better agreement with gamma counter values (lower relative error) compared to the radio-TLC scanner-based results.

For analysis of the chromatograms from the radio-TLC scanner, it was observed that participants used two different methods for integrating the area under the curve (AUC). In "Method 1", the area under each peak is integrated down to zero signal level. In "Method 2", a baseline is first drawn joining the left and right sides of each peak, and the AUC is computed for the area between the curve and the baseline. The varied analysis method introduced variation (higher relative uncertainty) into the radio-TLC scanner results, and the Method 2 analysis led to especially large errors in certain cases (i.e., for small peaks). For samples containing only 2 spots separated by 35 mm (plates A and B), the peaks showed minimal overlap and the AUC could be accurately computed by the radio-TLC scanner software. Results were in reasonable agreement with the gamma counter values, though error and uncertainty were higher than for CLI-based analysis, likely due to variation in where participants defined the edges of each peak and the mixture of integration methods. When the spots had very different activity levels (plate B), the relative uncertainty was significantly higher by switching to a CLI-based readout method, or alternatively by modifying the radio-TLC scanner to reduce the overlap (e.g., using a collimator on the detector head to decrease peak widths at the expense of reduced sensitivity, or increasing the length of the radio-TLC plates to increase separation between peaks at the expense of longer development times).

Superposition of Bright-Field and CLI Images

In some cases, it may be useful to superimpose the CLI image 108 onto a brightfield image of the radio-TLC plate 12. For example, the brightfield image could shows markings on the TC plate of spotting locations and solvent front to help quantify Rr values and identify radioactive species. An example of a superimposed image of a developed TLC plate is shown in FIG. 18.

TABLE 1

| | | Conventional radio-TLC scanner | | | Cerenkov luminescence imaging (CLI) | | |
|---|---|---|---|---|---|---|---|
| Plate | Gamma counter Fraction of activity in each spot (%) | Fraction of activity in each spot (average ± std. dev. %) | Relative error (%) | Relative uncertainty (%) | Fraction of activity in each spot (average ± std. dev. %) | Relative error (%) | Relative uncertainty (%) |
| A | 55.1 | 49.4 ± 0.7 | −10 | 1 | 52.1 ± 0.9 | −5 | 2 |
|   | 44.9 | 50.6 ± 0.7 | 13 | 1 | 47.5 ± 0.5 | 6 | 1 |
| B | 11.7 | 9.9 ± 1.0 | −15 | 10 | 11.1 ± 0.7 | −5 | 6 |
|   | 88.3 | 90.1 ± 1.0 | 2 | 1 | 88.9 ± 0.7 | 1 | 1 |
| C | 80.0 | 85.0 ± 4.3 | 6 | 5 | 81.2 ± 0.5 | 2 | 1 |
|   | 11.1 | 8.2 ± 3.2 | −26 | 39 | 10.6 ± 0.4 | −4 | 4 |
|   | 8.8 | 6.9 ± 1.4 | −22 | 20 | 8.1 ± 0.2 | −8 | 3 |
| D | 9.8 | 7.4 ± 2.3 | −25 | 32 | 9.7 ± 0.5 | −1 | 5 |
|   | 82.2 | 84.8 ± 4.9 | 3 | 6 | 82.5 ± 0.7 | 0 | 1 |
|   | 7.9 | 7.8 ± 2.6 | −1 | 34 | 7.8 ± 0.2 | −2 | 3 |
| E | 31.4 | 34.0 ± 1.3 | 8 | 4 | 32.3 ± 0.3 | 3 | 1 |
|   | 34.1 | 32.5 ± 1.3 | −5 | 4 | 35.2 ± 0.2 | 3 | 0 |
|   | 34.5 | 33.5 ± 0.6 | −3 | 2 | 32.4 ± 0.3 | −6 | 1 | for the lower activity spot. This trend was observed both for the CLI and radio-TLC scanner methods (6% relative uncertainty in the lower activity spot vs 1% in the higher activity spot for CLI; 10% vs 1% for radio-TLC scanner). In addition, the activity in the smaller peak tended to be underestimated (−5% relative error for CLI; −15% for radio-TLC scanner) while the large peak tended to be slightly overestimated.

These phenomena were exaggerated for the TLC plates 12 with three radioactive spots, where the corresponding peaks in the chromatogram were overlapping (plates C and D). Using CLI, the smallest spots were underestimated up to −8%, while using the radio-TLC scanner, the smallest peaks were underestimated up to −26%. In these cases, relative uncertainties were lower for CLI (<5%) but were quite high (20-39%) for radio-TLC-based analysis. The higher activity spots in samples C and D were quantified more accurately and precisely by both methods, though the relative accuracy and precision were significantly higher for the CLI-based method. For plate E, with more equal activity distribution among spots, the results were similar to plate A, despite the overlap observed in the radio-TLC chromatograms.

Overall, the relative uncertainty was much lower for CLI-based analysis compared to radio-TLC scanner software analysis. When analyzing radio-TLC plates containing regions of unequal radioactivity, CLI-based analysis showed improved quantitative accuracy. Because overlapping peaks are often observed in radio-TLC samples in the laboratory and in the literature, it is likely that many studies contain non trivial quantitation errors. Such errors could be minimized Table 1 shows the comparison of analyses using radio-TLC scanner software and CLI-based approach for the five TLC plates of FIG. 17. For each plate, the spots are listed in the order they would be encountered by the scanner (i.e., bottom to top in FIG. 17). Values for radio-TLC scanner and CLI-based analysis are derived from n=8 analyses of the same plate and are normalized to the measurements from the gamma counter. n=1 for the gamma counter measurements.

Optimization of Synthesis Conditions

One particular application of the system 2 and method is the optimization of radio-TLC conditions for the production of radiochemicals or radiopharmaceuticals. In one example, the system 2 was used to understand the impact of TLC mobile phase, type of TLC plate, and sample solvent and the quality and resolution of separation for [$^{18}$F]Flumazenil. For example, 90% MeCN as the TLC mobile phase resulted in separation in both a silica TLC plate and a reversed-phase TLC plate. Conversely, EtOAc/EtOH/H$_2$O (v/v; 3/1/1) as the mobile phase resulted in no separation in both a silica TLC plate and a reversed-phase TLC plate. For the sample solvent DMSO:thexyl alcohol (1:1 v/v) resulted in significant fronting while DMSO did not. The system 2 was also used to optimize [$^{18}$F]Flumazenil synthesis conditions. Optimization was carried out by performing sixty-four (64) reactions per day (16 different conditions, 4 replicates each). Multi-spot Cerenkov TLC was critical in enabling analysis of all these samples to quantify the fraction of unreacted [$^{18}$F]Fluoride, [18F]flumazenil, and any side products produced under each condition so the yield of the desired product could be maximized. FIGS. 19A-19F illustrate the optimization results of reaction conditions on fluorination efficiency (FIGS. 19A-19C) and crude radiochemical yield (RCY) (FIGS. 19D-19F) for temperature, base mount, and precursor concentration for the synthesis of [$^{18}$F]Flumazenil.

The system 2 was also used to optimize radio-TLC conditions for the analysis of crude [$^{18}$F]Florbetaben ([$^{18}$F] FBB). Cerenkov imaging helped to understand the impact of TLC mobile phase, type of TLC plate 12, and sample solvent and the quality and resolution of separation. By simultaneously separating different samples containing different species, it was possible to unambiguously identify which spot was which species in each Cerenkov image. The synthesis of [$^{18}$F]FBB involves two steps. First the precursor is fluorinated to produce the intermediate, then the intermediate is deprotected via acid to form the final product. Thus, the crude mixture can contain all three species (plus any potential impurities). Using reversed-phase TLC plate 12 (with 40 mm separation), a mobile phase of 10:90 v/v H$_2$O/MeCN was found to perform better than 1:1 v/v Hexane/EtOAc or 1:1 v/v H$_2$O/MeCN. This resulted in quick development times, developing in around 3 minutes.

While embodiments of the present invention have been shown and described, various modifications may be made without departing from the scope of the present invention. The invention, therefore, should not be limited except to the following claims and their equivalents.

What is claimed is:

1. A method of performing high-throughput radio thin layer chromatography (radio-TLC) comprising:
    spotting a plurality of locations adjacent to an edge of a first thin layer chromatography (TLC) plate with samples containing a radiochemical or a radiopharmaceutical, each location defining a discrete and separate lane on the first TLC plate for the respective samples;
    drying the spotted locations;
    developing the first TLC plate with a developing solution so as to simultaneously separate the samples within their respective lanes;
    drying the developed first TLC plate; and
    imaging the dried first TLC plate with a Cerenkov luminescence imaging device comprising a light-tight chamber and a camera, wherein the image obtained from the Cerenkov luminescence imaging device comprises a field of view that contains regions of interest from the respective lanes containing the samples.

2. The method of claim 1, wherein the camera comprises a cooled CCD camera.

3. The method of claim 1, wherein the plurality of locations are manually spotted on the first TLC plate.

4. The method of claim 1, wherein the plurality of locations are automatically spotted on the first TLC plate with an automatic sampler device.

5. The method of claim 1, wherein the first TLC plate is spotted with samples disposed within eight or more lanes.

6. The method of claim 1, wherein the spotting locations along adjacent lanes are separated by a pitch of 5 mm or less.

7. The method of claim 1, wherein the spotted locations comprise samples having volumes of 1 µL or less.

8. The method of claim 1, wherein the samples separate within the respective lanes of the first TLC plate at a separation distance between 15 mm and 35 mm.

9. The method of claim 1, wherein the first TLC plate is covered with a scintillator or with a glass plate.

10. The method of claim 1, wherein the respective lanes of the first TLC plate are separated from one another from a barrier material.

11. The method of claim 1, wherein the radiochemical or a radiopharmaceutical is labeled with a positron emitter, a beta emitter, or an alpha-emitter.

12. The method of claim 1, wherein the plurality of spotted locations on the first thin layer chromatography (TLC) plate are separated from one another by a substantially equal distance.

13. The method of claim 1, wherein the first TLC plate is developed in less than 5 minutes.

14. A method of performing high-throughput radio thin layer chromatography (radio-TLC) comprising:
    spotting a plurality of locations adjacent to an edge of multiple thin layer chromatography (TLC) plates with samples containing a radiochemical or a radiopharmaceutical, each TLC plate spotted at a plurality of locations with each location defining a discrete and separate lane on the respective TLC plate for the samples;
    drying the multiple TLC plates;
    developing the multiple TLC plates with a developing solution so as to simultaneously separate the samples within their respective lanes;
    drying the multiple developed TLC plates; and
    imaging the multiple TLC plates simultaneously with a Cerenkov luminescence imaging device comprising a light-tight chamber and a camera, wherein the image obtained from the Cerenkov luminescence imaging device comprises a field of view that contains regions of interest from the respective lanes containing the samples from the multiple TLC plates.

15. The method of claim 14, wherein the camera comprises a cooled CCD camera.

16. The method of claim 14, wherein the plurality of locations are manually spotted on each of the multiple TLC plates.

17. The method of claim 14, wherein the plurality of locations are automatically spotted on the multiple TLC plates with an automatic sampler device.

18. The method of claim 14, wherein each of the multiple TLC plates is spotted with samples disposed within eight or more lanes locations.

19. The method of claim 18, wherein the spotting locations along adjacent lanes in the multiple TLC plates are separated by a pitch of 5 mm or less.

20. The method of claim 14, wherein the spotted locations comprise samples having volumes of 1 µL or less.

21. The method of claim 14, wherein the samples separate within the respective lanes of the multiple TLC plates at a separation distance between 15 mm and 35 mm.

22. The method of claim 14, wherein the multiple TLC plates are covered with a scintillator or with a glass plate.

23. The method of claim 14, wherein the lanes of the multiple TLC plates are separated from one another from a barrier material.

24. A method of performing high-throughput radio thin layer chromatography (radio-TLC) comprising:
    spotting a plurality of locations adjacent to an edge of one or more thin layer chromatography (TLC) plates with samples containing a radiochemical or a radiopharmaceutical, each location defining a discrete and separate lane on the one or more TLC plates for the respective samples;
    drying the one or more TLC plates;
    developing the one or more TLC plates with a developing solution so as to simultaneously separate the samples within their respective lanes;
    drying the one or more developed TLC plates;

imaging the dried one or more TLC plates with an imaging device comprising a camera, wherein the image obtained from the camera comprises a field of view that contains regions of interest from the respective lanes; and
automatically identifying regions of interest from the plurality of lanes containing the samples in the image obtained with the camera with image processing software.

* * * * *